US012585087B2

(12) United States Patent　(10) Patent No.:　US 12,585,087 B2

Komiyama　(45) Date of Patent:　Mar. 24, 2026

(54) OPTICAL SYSTEM, IMAGE PICKUP APPARATUS, AND LENS APPARATUS

(71) Applicant: CANON KABUSHIKI KAISHA, Tokyo (JP)

(72) Inventor: Takahiro Komiyama, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 479 days.

(21) Appl. No.: 18/333,578

(22) Filed: Jun. 13, 2023

(65) Prior Publication Data

US 2023/0408797 A1　Dec. 21, 2023

(30) Foreign Application Priority Data

Jun. 17, 2022　(JP) ................................. 2022-097978

(51) Int. Cl.
*G02B 13/00*　(2006.01)
*H04N 23/55*　(2023.01)

(52) U.S. Cl.
CPC ......... *G02B 13/0045* (2013.01); *H04N 23/55* (2023.01)

(58) Field of Classification Search
CPC ............ G02B 13/0045; G02B 13/0035; G02B 13/18; G02B 13/06; H04N 23/55
USPC .......................................... 359/708
See application file for complete search history.

(56) References Cited

U.S. PATENT DOCUMENTS 11,092,787 B2　8/2021　Kim et al.
2017/0102526 A1*　4/2017　Chen .................. G02B 13/0045
2021/0356721 A1　11/2021　Komiyama

* cited by examiner

*Primary Examiner* — William R Alexander
*Assistant Examiner* — Alaina Marie Swanson
(74) *Attorney, Agent, or Firm* — Carter, DeLuca & Farrell LLP

(57)　ABSTRACT

An optical system includes, in order from an object side to an image side, a front unit having negative refractive power, an aperture stop, and a rear unit having positive refractive power. The front unit includes a plurality of aspheric lenses. A predetermined condition is satisfied.

23 Claims, 7 Drawing Sheets

OPTICAL SYSTEM, IMAGE PICKUP APPARATUS, AND LENS APPARATUS

BACKGROUND

Technical Field

One of the aspects of the disclosure relates to an optical system, and more particularly to an optical system suitable for digital video cameras, digital still cameras, broadcasting cameras, film-based cameras, surveillance cameras, in-vehicle cameras, and the like.

Description of Related Art

U.S. patent Ser. No. 11/092,787 discloses a wide-angle optical system that includes a lens unit having negative refractive power, an aperture stop, and a lens unit having positive refractive power.

The wide-angle optical system needs to satisfactorily correct negative distortion caused by strong positive refractive power. The wide-angle optical system tends to have a small peripheral light amount ratio, and thus needs to correct the peripheral light amount.

The optical system disclosed in U.S. patent Ser. No. 11/092,787 generates large negative distortion of about −100%. The negative distortion has an effect of compressing an object on the image plane so as to increase (correct) the peripheral light amount. If the negative distortion is corrected, the effect of improving the peripheral light amount due to the negative distortion is reduced. Therefore, the optical system disclosed in U.S. patent Ser. No. 11/092,787 has difficulty in correcting negative distortion and a peripheral light amount.

SUMMARY

One of the aspects of the present disclosure provides an optical system that can correct distortion and a peripheral light amount.

An optical system according to one aspect of the disclosure includes, in order from an object side to an image side, a front unit having negative refractive power, an aperture stop, and a rear unit having positive refractive power. The front unit includes a plurality of aspheric lenses. The following inequality is satisfied:

$$0.05 < x1/f < 0.50$$

where T is a distance on an optical axis from a surface vertex of an aspheric surface on the object side of each of the plurality of aspheric lenses to the aperture stop, EA is an effective diameter of the aspheric surface, x1 is a distance in an optical axis direction between a position on a reference spherical surface, which is defined as a spherical surface passing a position on the aspheric surface distant from an optical axis by a distance of T/2 in a direction orthogonal to the optical axis and the surface vertex, distant from the optical axis by a distance of EA/2 in the direction orthogonal to the optical axis and a position on the aspheric surface distant from the optical axis by the distance of EA/2 in the direction orthogonal to the optical axis, and f is a focal length of the optical system. An image pickup apparatus and a lens apparatus each including the above optical system also constitute another aspect of the disclosure.

Further features of the disclosure will become apparent from the following description of embodiments with reference to the attached drawings.

DESCRIPTION OF THE EMBODIMENTS

Figures 1, 2:
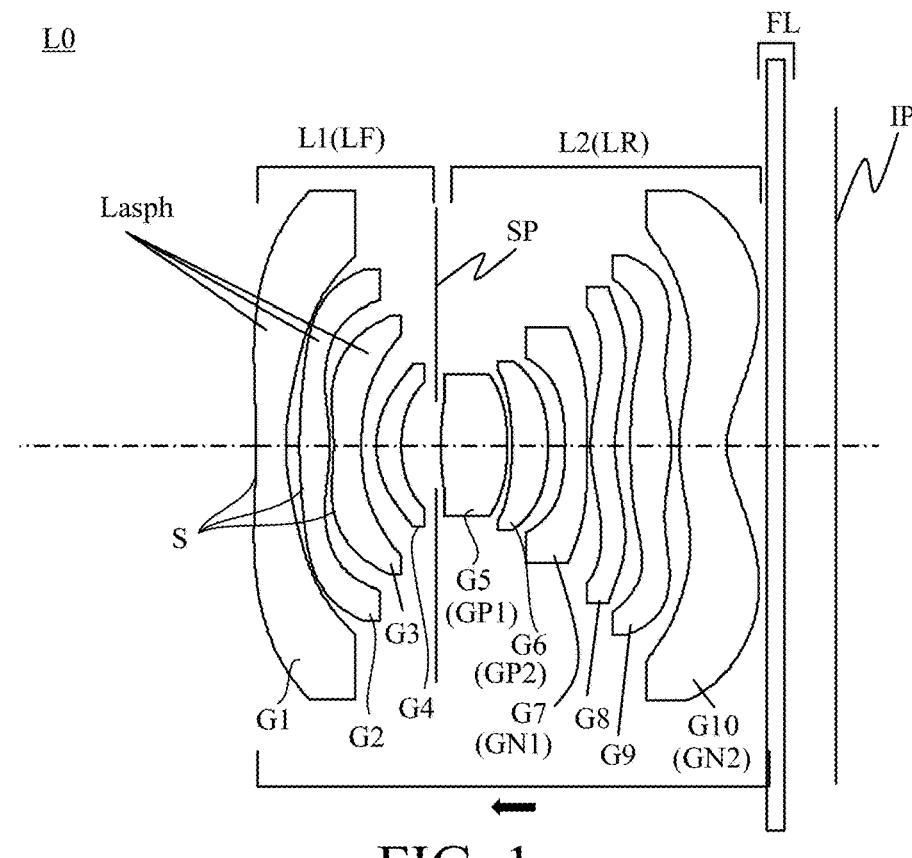
FIG. 1 is a sectional view of an optical system according to Example 1 in an in-focus state at infinity.
FIG. 2 is a longitudinal aberration diagram of the optical system according to Example 1.
Figures 3, 4:
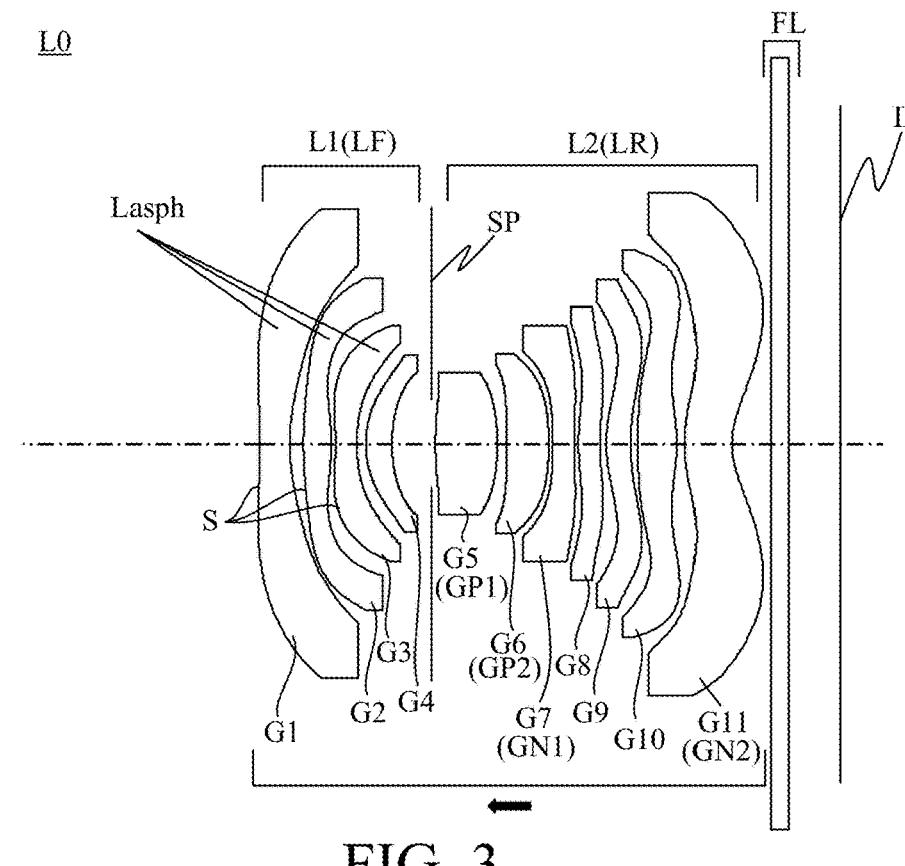
FIG. 3 is a sectional view of an optical system according to Example 2 in an in-focus state at infinity.
FIG. 4 is a longitudinal aberration diagram of the optical system according to Example 2.
Figure 5:
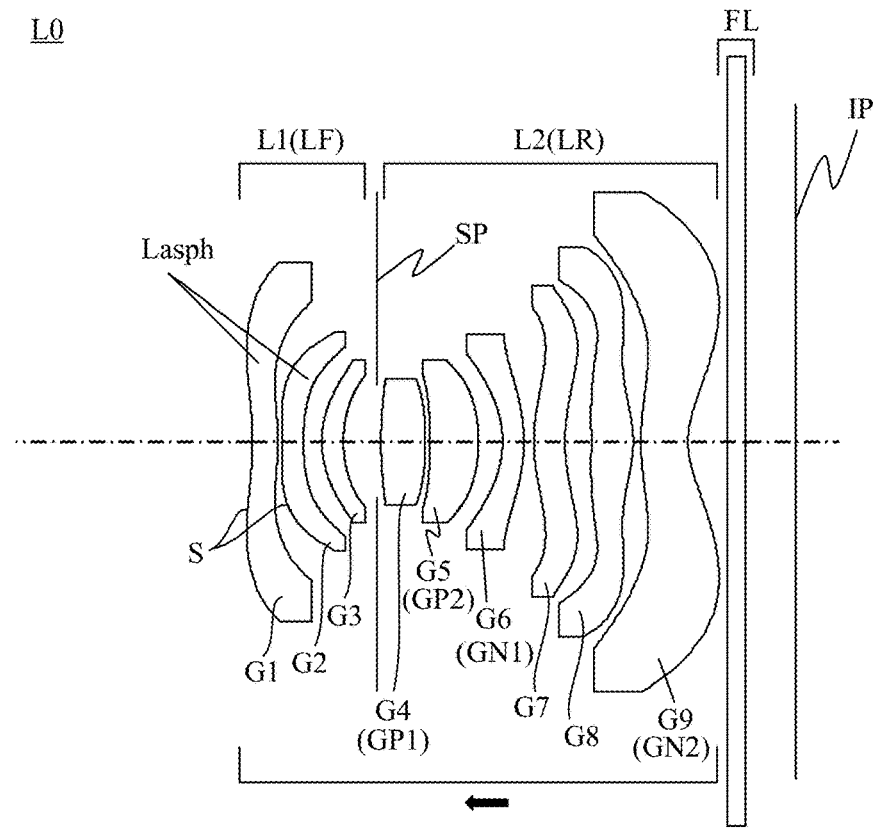
FIG. 5 is a sectional view of an optical system according to Example 3 in an in-focus state at infinity.
Figure 6:
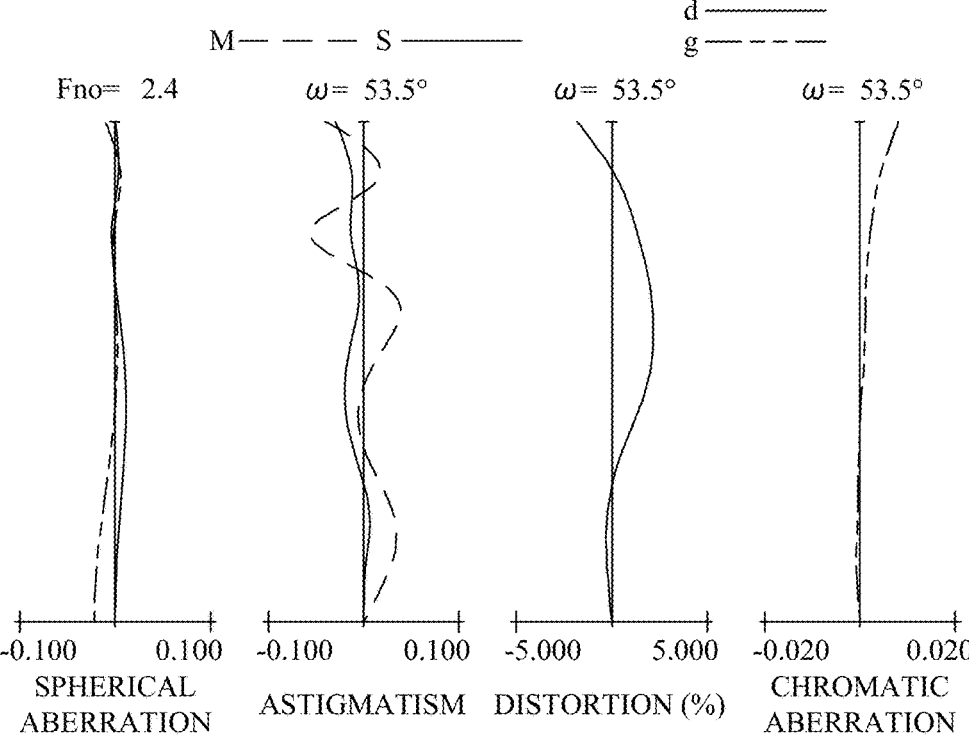
FIG. 6 is a longitudinal aberration diagram of the optical system according to Example 3.
Figure 7:
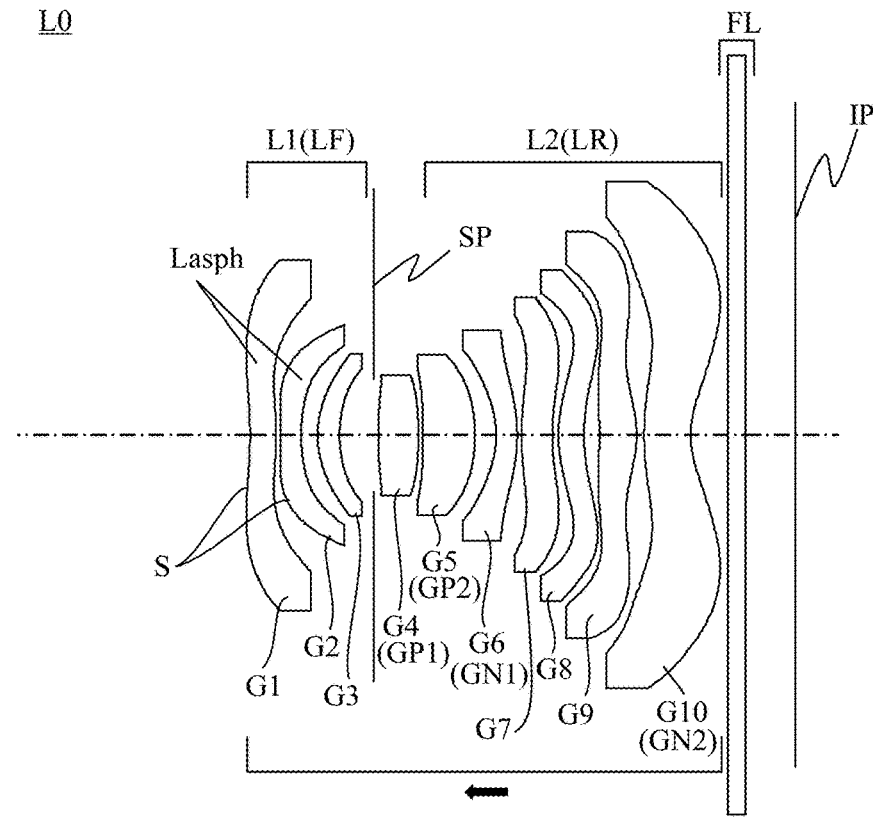
FIG. 7 is a sectional view of an optical system according to Example 4 in an in-focus state at infinity.
Figure 8:
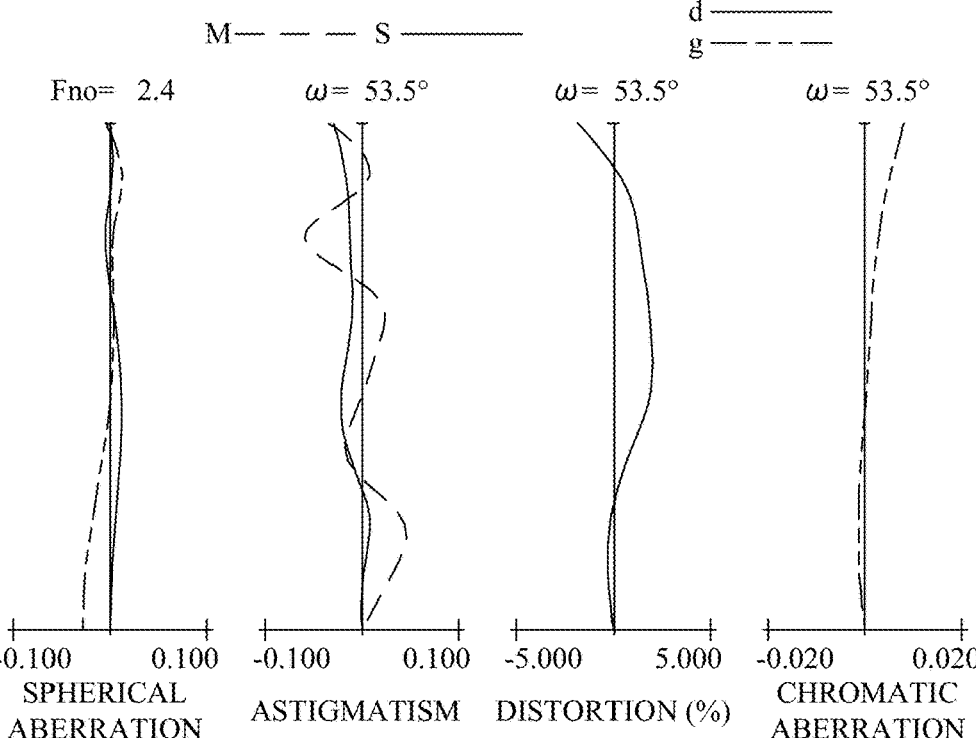
FIG. 8 is a longitudinal aberration diagram of the optical system according to Example 4.
Figures 9, 10:
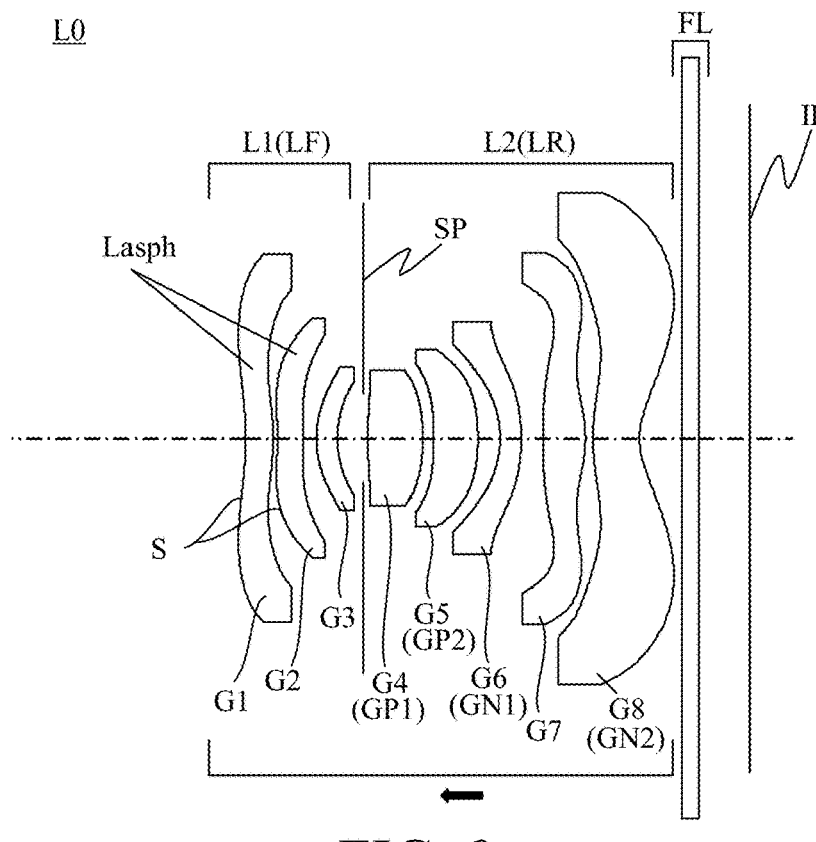
FIG. 9 is a sectional view of the optical system according to Example 5 in an in-focus state at infinity.
FIG. 10 is a longitudinal aberration diagram of the optical system according to Example 5.

Referring now to the accompanying drawings, a detailed description will be given of embodiments according to the disclosure. Corresponding elements in respective figures will be designated by the same reference numerals, and a duplicate description thereof will be omitted.

FIGS. 1, 3, 5, 7, and 9 are sectional views of optical systems according to Examples 1 to 5 in in-focus states at infinity (on an infinity object), respectively. The optical system according to each example is used in an optical apparatus including an interchangeable lens and an image pickup apparatus, such as a digital video camera, a digital still camera, a broadcasting camera, a film-based film camera, a surveillance camera, and an in-vehicle camera.

In each sectional view, a left side is an object side, and a right side is an image side. The optical system according to each example includes a plurality of lens units. As used herein, a lens unit is a group of lenses separated by an aperture stop SP. The optical system according to each example may be used as a projection lens for a projector or the like. In this case, the left side is a screen side, and the right side is a projected image side. The lens unit may include one lens or more. The lens unit may include an aspheric lens, a Fresnel lens, a diffractive optical element, and the like, which do not have refractive power (paraxial curvature of infinity) near the optical axis.

The optical system L0 according to each example includes, in order from the object side to the image side, a front unit L1 (LF) having positive refractive power, an aperture stop SP, and a rear unit L2 (LR) having negative refractive power. This configuration provides a so-called retrofocus power arrangement, and can easily secure a back focus in the wide-angle scheme of the optical system L0. The front unit L1 has negative refractive power, is disposed on the object side of the aperture stop SP, and can satisfactorily correct distortion and curvature of field, which are difficult to correct in a wide-angle optical system.

In each sectional view, Li represents an i-th (i is a natural number) lens unit counted from the object side among the lens units included in the optical system. Gk represents a k-th (k is a natural number) lens counted from the object side among the lenses included in the optical system.

IP represents an image plane. In a case where the optical system L0 according to each example is used as an imaging optical system for a digital still camera or a digital video camera, an imaging plane of a solid-state image sensor (photoelectric conversion element) such as a CCD sensor or a CMOS sensor is placed on the image plane IP. In a case where the optical system L0 according to each example is used as an imaging optical system for a film-based camera, a photosensitive plane corresponding to a film plane is placed on the image plane IP. FL denotes an optical block corresponding to an optical filter, a face plate, a crystal low-pass filter, an infrared cut filter, and the like. Lasph and S are an aspheric lens that satisfies inequality (1) and an aspheric surface on the object side of the aspheric lens, respectively.

An arrow illustrated in each sectional view represents a moving direction of a lens unit during focusing from infinity to close (short distance object). In each example, the entire optical system L0 moves from the image side to the object side during focusing from infinity to close. Focusing may be performed by moving only part of lenses included in the optical system L0 from the image side to the object side or from the object side to the image side.

FIGS. 2, 4, 6, 8, and 10 are longitudinal aberration diagrams of the optical systems L0 according to Examples 1 to 5, respectively. In the spherical aberration diagram, Fno is the F-number. The spherical aberration indicates spherical aberrations for the d-line (wavelength 587.6 nm) and g-line (wavelength 435.8 nm). In the astigmatism diagram, S indicates an astigmatism amount on a sagittal image plane, and M indicates an astigmatism amount on a meridional image plane. The distortion diagram illustrates a distortion amount for the d-line. The chromatic aberration diagram illustrates a chromatic aberration amount for the g-line. ω is an imaging half angle of view (degrees).

A description will now be given of a characteristic configuration of the optical system according to each example.

Figure 11A:
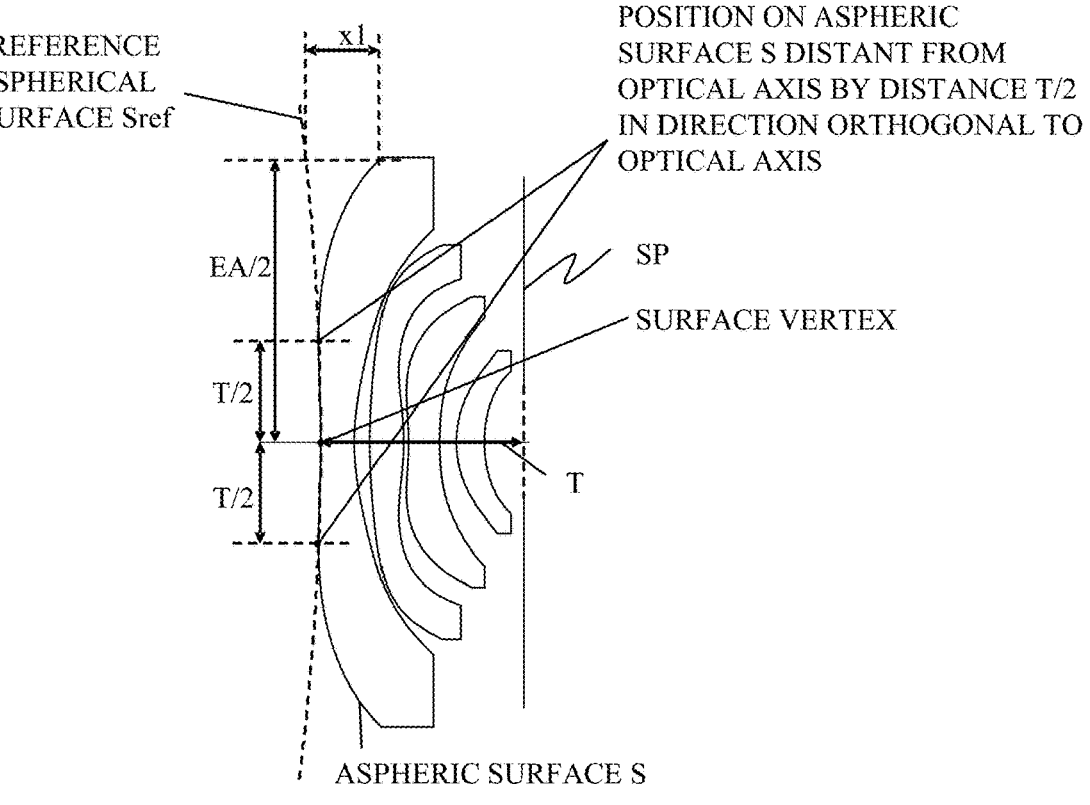
FIGS. 11A and 11B illustrate a sagittal amount.

Referring now to FIG. 11A, a description will be given of a sagittal amount (sag amount) x1. In calculating the sagittal amount x1, first, reference spherical surface Sref is determined. Where T is a distance on the optical axis from a surface vertex of an aspheric surface S on the object side of the aspheric lens Lasph to the aperture stop SP, the reference spherical surface Sref is defined as a spherical surface that passes a position on the aspheric surface S distant from the optical axis by a distance of T/2 in the direction orthogonal to the optical axis and the surface vertex of aspheric surface S. The "position on the aspheric surface S distant from the optical axis by the distance of T/2 in the direction orthogonal to the optical axis" is expressed as two points on the lens section in FIG. 11A, but actually includes all concentric positions on the aspheric surface S distant from the optical axis by the distance of T/2 in the direction orthogonal to the optical axis. Where EA is a distance that is an effective diameter of the aspheric surface S, the sagittal amount x1 is a distance in the optical axis direction between a position on the reference spherical surface Sref distant from the optical axis by a distance of EA/2 in the direction orthogonal to the optical axis and a position on the aspheric surface S distant from the optical axis by a distance of EA/2. The sign of the sagittal amount x1 is positive in a case where the aspheric surface S is located on the image side of the reference spherical surface Sref. The effective diameter EA is the diameter of the area which light enters in the aspheric surface S. In other words, the effective diameter EA is the diameter of the area determined by the incident position of a light ray that passes the farthest position from the optical axis in the direction orthogonal to the optical axis among light rays that enter the aspheric surface S.

The optical system according to each example satisfies the following inequality (1):

$$0.05 < x1/f < 0.50 \tag{1}$$

where f is a focal length of the optical system L0, and x1 is a sagittal amount.

Inequality (1) defines the sagittal amount. In a case where negative distortion is corrected in a wide-angle optical system, the compression effect of the negative distortion on the image plane of the object becomes small, and as a result, it becomes difficult to increase the peripheral light amount ratio. Therefore, the peripheral light amount ratio may be increased by adopting a lens configuration that increases the aperture efficiency, which is an area ratio of an off-axis incident light beam to an on-axis incident light beam in a section orthogonal to the optical axis. In order to increase the aperture efficiency, so-called coma of the entrance pupil may be generated for the off-axis light beam. The coma of the entrance pupil is aberration of an image (that is, the off-axis entrance pupil) formed by the front unit L1 using the sectional area orthogonal to the optical axis of the off-axis light beam at the position of the aperture stop SP. In order to generate the desired aberration at the entrance pupil, it is necessary to place a lens in the front unit L1 whose lens surface on the object side is strongly convex relative to the off-axis light beam. For example, in a case where a spherical lens has such a configuration, a surface having a strong positive curvature from the paraxial area is required, and the sagittal amount of the surface becomes too large from the center to the periphery. Thereby, the thickness of the lens increases, and it becomes difficult to reduce the size of the optical system L0. In order to achieve both coma of the entrance pupil and the miniaturization of the optical system, the paraxial curvature is to be a weak positive or negative curvature, and the lens surface on the object side of the aspheric lens Lasph is to be set to the aspheric surface S that has a strong convex shape in the peripheral portion which the off-axis light beam passes. In other words, the aspheric surface S has a shape in which the absolute value of the curvature is small near the optical axis and is almost flat, and the sagittal amount abruptly increases toward the object side as a position approaches the periphery.

The reason why the sagittal amount x1 in inequality (1) is determined based on the reference spherical surface Sref is to express a change in the sagittal amount from an area near the optical axis on the aspheric surface S (inside the position distant by the distance of T/2 in the direction orthogonal to the optical axis) to the peripheral portion. That is, since the aspheric surface S is nearly flat near the optical axis, the absolute value of the radius of curvature of the reference spherical surface Sref has a large value, and the sagittal amount x1 has a large value due to the strong convex shape. The aspheric surface Lasph corrects negative distortion as well as the peripheral light amount ratio, but generally cannot perfectly independently control them because coma of the entrance pupil and distortion have a dependent relationship. Therefore, it is difficult to set coma of the entrance pupil and distortion to desired values using a single aspheric lens, and it is necessary to be dispose two or more aspheric surfaces Lasph.

In a case where the sagittal amount x1 becomes smaller and the value x1/f becomes lower than the lower limit of inequality (1), this is beneficial to the miniaturization of the optical system L0, but it becomes difficult to generate sufficient coma of the entrance pupil, and the peripheral light amount and it becomes difficult to increase the peripheral light amount ratio. In a case where the sagittal amount x1 becomes larger and the value x1/f becomes higher than the upper limit of inequality (1), the sagittal amount of the aspheric surface S becomes too large, and the thickness of the aspheric lens Lasph including the peripheral portion becomes too large. As a result, the size of the optical system L0 increases.

Inequality (1) may be replaced with inequality (1a) below:

$$0.07 < x1/f < 0.45 \tag{1a}$$

Inequality (1) may be replaced with inequality (1b) below:

$$0.10 < x1/f < 0.42 \tag{1b}$$

Inequality (1) may be replaced with inequality (1c) below:

$$0.12 < x1/f < 0.40 \tag{1c}$$

A description will now be given of the configuration that may be satisfied by the optical system L0 according to each example.

A lens (first lens) GP1 disposed closest to the object in the rear unit L2 may has positive refractive power. Placing a lens having positive refractive power near the aperture stop SP can realize a wide-angle optical system due to the refractive power.

The rear unit L2 includes, in order from the object side to the image side, a lens GP1 having positive refractive power, a lens (second lens) GP2 having positive refractive power, and a lens (third lens) GN1 having negative refractive power. As described above, a lens having positive refractive power may be disposed near the aperture stop SP, but necessary positive refractive power becomes stronger as the optical system L0 has a wider angle. Therefore, the strong positive refractive power is shared between the lenses GP1 and GP2 so as to reduce the refractive power per lens and widen the angle of the optical system L0 while spherical aberration and longitudinal chromatic aberration are suppressed. Disposing the lens GN1 having negative refractive power on the image side of the lenses GP1 and GP2 can further correct longitudinal chromatic aberration.

At least one of the lens surface on the object side and the lens surface on the image side of each of the lenses GP1, GP2, and GN1 may be aspheric in order to further correct spherical aberration and coma.

The front unit L1 may include a lens having negative refractive power and a lens having positive refractive power. Since the front unit L1 includes a lens having a negative refractive power, the optical system L0 can have a retrofocus configuration and a back focus can be secured. In addition, the front unit L1 including the lens having positive refractive power can dispose positive refractive power substantially symmetrically to the lenses GP1 and GP2 with respect to the aperture stop SP and this symmetry can easily correct curvature of field and distortion.

The lens (final lens) GN2 disposed closest to the image plane in the rear unit L2 may have negative refractive power. In a case where the size of the optical system L0 becomes smaller, the positive refractive power of each single lens tends to increase, and curvature of field occurs (undercorrection). Astigmatism also occurs. Disposing the lens GN having negative refractive power closest to the image plane in the rear unit L2 can correct the Petzval sum without affecting sagittal flare (lateral aberration in the sagittal direction) and consequently the curvature of field. In addition, since the lens GN2 is disposed near the image plane, the on-axis light beam and the off-axis light beam can be sufficiently separated and pass through the lens surface, and the effect of correcting field curvature and astigmatism can be enhanced.

Both surfaces of the lens GN2 (the lens surface on the object side and the lens surface on the image side of the lens GN2) may be aspheric in order to further enhance the correction effect.

The lens disposed closest to the image plane in the front unit L1 may be a meniscus lens having a concave lens surface on the image side and positive refractive power. Negative distortion tends to occur in a wide-angle optical system, but making concave the lens surface on the image side of the lens closest to the image plane of the front unit L1 can bend the light ray and reduce negative distortion.

A description will now be given of the conditions that the optical system L0 according to each example may satisfy.

The optical system according to each example may satisfy the following inequality (2):

$$0.05 < x2/f < 0.50 \tag{2}$$

Figure 11B:
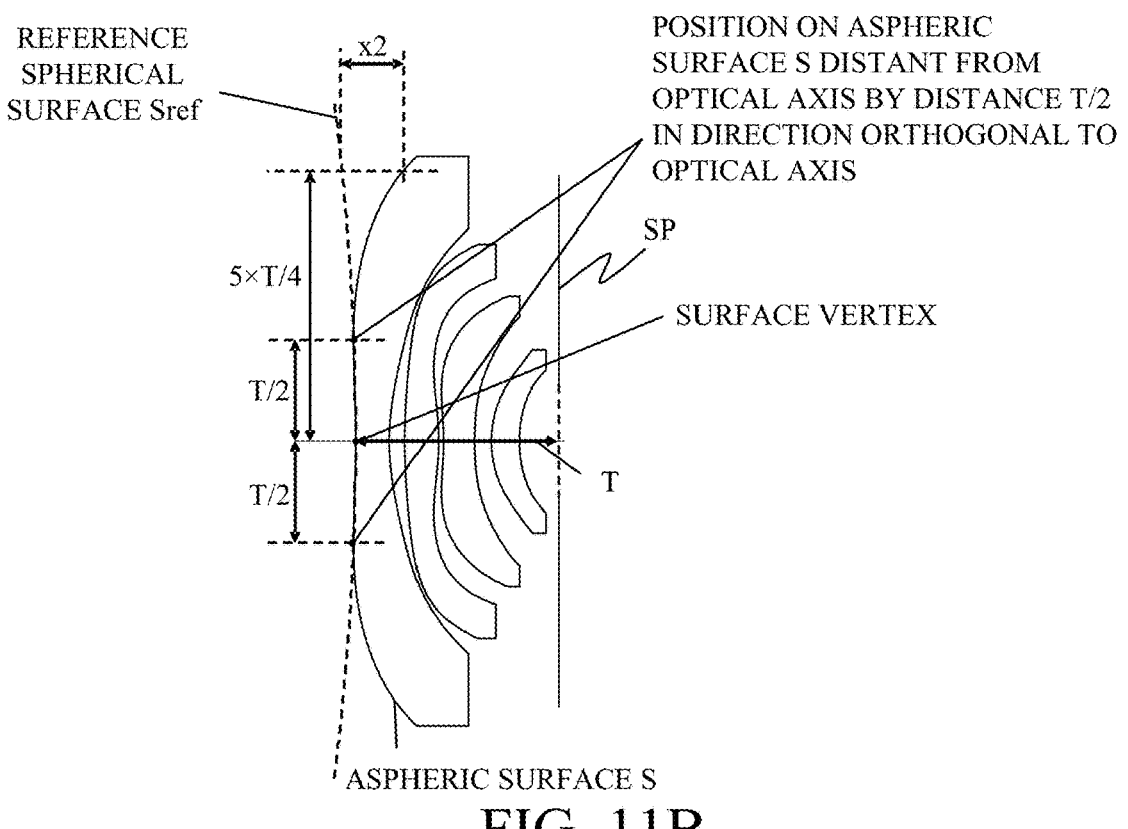

Here, as illustrated in FIG. 11B, x2 is a distance in the optical axis direction between a position on the reference spherical surface Sref distant from the optical axis by a distance of 5×T/4 in the direction orthogonal to the optical axis and a position on the aspheric surface S distant from the optical axis by a distance of 5×T/4 in the direction orthogonal to the optical axis.

In order to reduce the size (thickness) of the optical system, the off-axis light beam incident on the front unit L1 may be gently refracted from the incident angle and guided to the aperture stop SP without being significantly refracted in the vertical direction. In a wide-angle optical system, the height from the optical axis of the off-axis light beam passing through each surface of the front unit L1 has a value close to a distance on the optical axis from each surface to the aperture stop SP. Therefore, due to inequality (2), the aspheric surface S near an area through which the off-axis light beam passes has a convex shape suitable to generate coma of the entrance pupil.

In a case where the sagittal amount x2 becomes smaller and the value becomes lower than the lower limit of inequality (2), this is beneficial to miniaturization of the optical system L0, but it becomes difficult to generate sufficient coma of the entrance pupil and to increase a peripheral light amount ratio. In a case where the sagittal amount x2 becomes larger and the value becomes higher than the upper limit of inequality (2), the sagittal amount of the aspheric surface S becomes too large, and the aspheric lens Lasph including the peripheral portion becomes too thick. As a result, the optical system L0 becomes large.

The optical system according to each example may satisfy one or more of the following inequalities (3) to (14):

$$1.30 < |Rrefl|/f \tag{3}$$

$$0.20 < D1/D2 < 0.80 \tag{4}$$

$$0.70 < fGP1/f < 2.00 \tag{5}$$

$$-0.70 < f/fLF \leq 0.00 \tag{6}$$

$$0.50 < fLR/f < 1.30 \tag{7}$$

$$-2.50 < fGN2/f < -0.50 \tag{8}$$

$$-2.50 < fGN1/f < -0.80 \tag{9}$$

$$0.50 < Dsum/D0 < 0.90 \tag{10}$$

$$0.25 < hGN2/D2 < 0.70 \tag{11}$$

$$0.20 < h/D1 < 1.00 \tag{12}$$

$$1.620 < n < 1.750 \tag{13}$$

$$12 < vd < 28 \tag{14}$$

Here, Rref is a radius of curvature of the reference spherical surface Sref. D1 is a distance on the optical axis from the lens surface on the object side of the aspheric lens Lasph disposed closest to the object among the plurality of aspheric lenses Lasph to the aperture stop SP. D2 is a distance on the optical axis from the aperture stop SP to the lens surface closest to the image plane in the rear unit L2. fGP1 is a focal length of the lens GP1 having positive refractive power and disposed closest to the object in the rear unit L2. fLF is a focal length of the front unit L1. fLR is a focal length of the rear unit L2. fGN2 is a focal length of the lens GN2 having negative refractive power and disposed closest to the image plane in the rear unit L2. fGN1 is a focal length of the lens GN1 having negative refractive power and disposed in the rear unit L2. Dsum is an overall thickness (distance on the optical axis) of the lenses included in the optical system L0. D0 is a distance on the optical axis from the lens surface closest to the object to the lens surface closest to the image plane in the optical system L0. hGN2 is a distance in the direction orthogonal to the optical axis to the stationary point of the lens surface on the image side of the lens GN2, which lens surface has a concave shape on the image side near the optical axis and a convex shape on the image side in the peripheral portion. h is a distance in the direction orthogonal to the optical axis to the stationary point on a lens surface on the object side of an aspheric lens Lasph disposed closest to the object among the plurality of aspheric lenses Lasph. n is a refractive index of the lens GN1. vd is an Abbe number of the lens GN1.

The stationary point is a point (distant by a predetermined position h) at which a value of a first derivative obtained by differentiating once X(h) using the predetermined distance h is 0, where X(h) is a sagittal amount (displacement amount) on the optical axis between the surface vertex and the position on the aspheric surface distant from the optical axis by the predetermined distance h in the direction orthogonal to the optical axis. The sign of X(h) is positive in a direction from the object side to the image side.

Inequalities (2) to (14) may be replaced with inequalities (2a) to (14a):

$$0.06 < x2/f < 0.45 \tag{2a}$$

$$1.40 < |Rref|/f \tag{3a}$$

$$0.25 < D1/D2 < 0.75 \tag{4a}$$

$$0.75 < fGP1/f < 1.85 \tag{5b}$$

$$-0.65 < f/fLF \leq 0.00 \tag{6a}$$

$$0.60 < fLR/f < 1.20 \tag{7a}$$

$$-2.30 < fGN2/f < -0.55 \tag{8a}$$

$$-2.30 < fGN1/f < -0.90 \tag{9a}$$

$$0.52 < Dsum/D0 < 0.85 \tag{10a}$$

$$0.28 < hGN2/D2 < 0.65 \tag{11a}$$

$$0.25 < h/D1 < 0.98 \tag{12a}$$

$$1.630 < n < 1.730 \tag{13a}$$

$$16 < vd < 26 \tag{14a}$$

Inequalities (2) to (14) may be replaced with inequalities (2b) to (14b):

$$0.07 < x2/f < 0.40 \tag{2b}$$

$$1.50 < |Rref|/f \tag{3b}$$

$$0.30 < D1/D2 < 0.70 \tag{4b}$$

$$0.85 < fGP1/f < 1.75 \tag{5b}$$

$$-0.55 < f/fLF \leq 0.00 \tag{6b}$$

$$0.70 < fLR/f < 1.10 \tag{7b}$$

$$-2.15 < fGN2/f < -0.60 \tag{8b}$$

$$-2.10 < fGN1/f < -1.10 \tag{9b}$$

$$0.58 < Dsum/D0 < 0.82 \tag{10b}$$

$$0.33 < hGN2/D2 < 0.60 \tag{11b}$$

$$0.30 < h/D1 < 0.95 \tag{12b}$$

$$1.645 < n < 1.720 \tag{13b}$$

$$18 < vd < 25 \tag{14b}$$

Inequalities (2) to (14) may be replaced with inequalities (2c) to (14c):

$$0.08 < x2/f < 0.38 \tag{2c}$$

$$1.60 < |Rref|/f \tag{3c}$$

$$0.32 < D1/D2 < 0.68 \tag{4c}$$

$$1.00 < fGP1/f < 1.60 \tag{5c}$$

$$-0.45 < f/fLF < 0.00 \tag{6c}$$

$$0.80 < fLR/f < 1.00 \tag{7c}$$

$$-2.05 < fGN2/fLR < -0.70 \tag{8c}$$

$$-1.95 < fGN1/fLR < -1.20 \tag{9c}$$

$$0.60 < Dsum/D0 < 0.80 \tag{10c}$$

$$0.38 < hGN2/D2 < 0.55 \tag{11c}$$

$$0.35 < h/D1 < 0.92 \tag{12c}$$

$$1.650 < n < 1.700 \tag{13c}$$

$$20 < vd \, 24 \tag{14c}$$

Inequality (3) defines a ratio of the absolute value |Rref| of the radius of curvature of the reference spherical surface Sref to the focal length of the optical system L0. As described above, the aspheric surface S may be flat near the optical axis (close to a plane with a small sagittal amount) in order to reduce the size of the optical system L0. That is, the absolute value |Rref| may be larger within a range that satisfies inequality (3). The absolute value |Rref| is infinite on a plane. In a case where the absolute value |Rref| becomes small and the value |Rref|/f is lower than the lower limit of inequality (3), the curvature near the optical axis becomes too large, and the front unit L1 becomes thicker. In a case where the curvature near the optical axis becomes too large and the value |Rrefl|/f is higher than the higher limit of inequality (3), the effect of generating coma of the entrance pupil becomes small.

Inequality (4) defines a ratio of a distance on the optical axis from the lens surface on the object side of the aspheric lens Lasph disposed closest to the object to the aperture stop SP, to a distance on the optical axis from the aperture stop SP to the lens surface closest to the image plane in the rear unit L2. Due to inequality (4), the lenses can be disposed substantially symmetrically to the aperture stop SP, and this symmetry can easily correct curvature of field and distortion. In addition, the aspheric surface S of the front unit L1 facilitates control of coma of the entrance pupil, and can improve the peripheral light amount ratio. In a case where the value D1/D2 is lower than the lower limit of inequality (4), the effect of correcting aberrations and the effect of improving the peripheral light amount ratio by the front unit L1 become small. In a case where the value D1/D2 is higher than the upper limit of inequality (4), the effect of correcting aberrations and the effect of improving the peripheral light amount ratio by the front unit L1 increase but the front lens of the optical system L0 becomes larger, and the size of the optical system tends to increase.

Inequality (5) defines a ratio of the focal length of the lens GP1 to the focal length of the optical system L0. Due to inequality(5), the angle of the optical system L0 can become wider. In a case where the focal length of the lens GP1 becomes smaller and the value fGP1/f is lower than the lower limit of inequality (5), this is beneficial to a wide-angle scheme of the optical system L0, but the lens GP1 causes large spherical aberration and curvature of field. In a case where the focal length of the lens GP1 becomes large and the value fGP1/f is higher than the upper limit of inequality (5), it becomes difficult to widen the angle of the optical system L0.

Inequality (6) defines a ratio of the focal length of the optical system L0 to the focal length of the front unit L1. Satisfying inequality (6) can secure a necessary back focus. In a case where the value f/fLF is lower than the lower limit of inequality (6), the back focus becomes too large and the overall length of the optical system L0 becomes long. In a case where the value f/fLF is higher than the upper limit of inequality (6), the refractive power of the front unit L1 becomes positive, and it becomes difficult to secure the back focus.

Inequality (7) defines a ratio of the focal length of the optical system L0 to the focal length of the rear unit L2. Satisfying inequality (7) can make wider the angle of the optical system L0. In a case where the value fLR/f is lower than the lower limit of inequality (7), this is beneficial to a wider angle of the optical system L0, but large spherical aberration and curvature of field occur in the rear unit L2. In a case where the value fLR/f is higher than the upper limit of inequality (7), it becomes difficult to widen the angle of the optical system L0.

Inequality (8) defines a ratio of the focal length of the lens GN2 disposed closest to the image plane in the rear unit L2 and the focal length of the optical system L0. Satisfying inequality (8) can correct the positive Petzval sum caused by the strong positive refractive powers of the lenses GP1, GP2, etc., and satisfactorily correct curvature of field. In a case where the value fGN2/fLR becomes lower than the lower limit of inequality (8), the curvature of field becomes overcorrected (excessively corrected). In a case where the value fGN2/fLR becomes higher than the upper limit of inequality (8), field curvature becomes undercorrected (insufficiently corrected).

Inequality (9) defines a ratio of the focal length of the lens GN1 to the focal length of the optical system L0. Satisfying inequality (9) can satisfactorily correct longitudinal chromatic aberration and spherical aberration caused by the strong positive refractive powers of the lenses GP1 and GP2. In a case where the value fGN1/f becomes lower than the lower limit of inequality (9), longitudinal chromatic aberration and spherical aberration become overcorrected. In a case where the value fGN1/f becomes higher than the upper limit of inequality (9), longitudinal chromatic aberration and spherical aberration become undercorrected.

Inequality (10) defines a ratio of the overall thickness of the lenses in the optical system L0 to the distance on the optical axis from the surface closest to the object to the surface closest to the image plane of the optical system L0. Satisfying inequality (10) can reduce the thickness of the optical system L0. In a case where the value Dsum/DO becomes lower than the lower limit of inequality (10), the lens becomes too thin, and it becomes difficult to manufacture the lens. In a case where the value Dsum/DO becomes higher than the upper limit of inequality (10), the thickness of the optical system L0 cannot be reduced.

Inequality (11) defines a ratio of the distance in the direction orthogonal to the optical axis to the stationary point of a lens surface that has a concave shape on the image side near the optical axis and a convex shape on the image side in the peripheral portion of the lens GN2, and the distance on the optical axis from the aperture stop SP to the lens surface closest to the image plane of the rear unit L2. Satisfying inequality (11) can significantly change the curvature near the optical axis of the lens GN2 and the curvature in the peripheral portion of the lens GN2, and can enhance the effect of correcting curvature of field and astigmatism in the lens GN2. In addition, since the lens surface on the image side of the lens GN2 has a concave shape toward the image side near the optical axis and a convex shape toward the image side in the peripheral portion, astigmatism can be corrected in the peripheral portion while the Petzval sum can be corrected near the optical axis. In a case where the value hGN2/D2 becomes lower than the lower limit of inequality (11), the curvature near the optical axis becomes small, the concave shape around the optical axis becomes shallow, and the paraxial negative refractive power becomes small. As a result, it becomes difficult to correct the Petzval sum. In a case where the value hGN2/D2 becomes higher than the upper limit of inequality (11), the convex area in the peripheral portion is reduced in the radial direction, and the effect of correcting astigmatism for off-axis light beams is reduced.

Inequality (12) defines a ratio of the distance in the direction orthogonal to the optical axis from the lens surface on the object side of the aspheric lens Lasph disposed closest to the object to the stationary point, to the distance on the optical axis from the lens surface on the object side of the aspheric lens Lasph to the aperture stop SP. Even in a case where the curvature near the optical axis of that surface is small (nearly flat), satisfying inequality (12) can significantly change the curvature of the peripheral portion to be convex toward the object side and easily control coma of the entrance pupil for the off-axis light beam. In a case where the value h/D1 becomes lower than the lower limit of inequality (12), the curvature around the surface becomes too large, and manufacturing becomes difficult. In a case where the value h/D1 becomes higher than the upper limit of inequality (12), the sagittal amount around the surface becomes too small, and it becomes difficult to generate coma of the entrance pupil for an off-axis light beam.

Inequality (13) defines the refractive index of the lens GN1. Satisfying inequality (13) can satisfactorily correct spherical aberration and longitudinal chromatic aberration generated in the lenses GP1, GP2, etc. The lens GN1 can be made of a resin material such as plastic, and the weight of the optical system L0 can be reduced. In a case where the value n becomes lower than the lower limit of inequality (13), the curvature of the lens GN1 becomes too large, and spherical aberration becomes overcorrected. In a case where the value n becomes higher than the upper limit of inequality (13), it becomes difficult to form the lens GN1 from a resin material.

Inequality (14) defines the Abbe number of the lens GN1. Satisfying inequality (14) can satisfactorily correct spherical aberration and longitudinal chromatic aberration caused by the lenses GP1, GP2, etc. The lens GN1 can be made of a resin material such as plastic, and the weight of the optical system L0 can be reduced. In a case where the value vd becomes lower than the lower limit of inequality (14), longitudinal chromatic aberration becomes overcorrected. In a case where the value vd becomes higher than the upper limit of inequality (14), longitudinal chromatic aberration becomes undercorrected.

A detailed description will now be given of the optical system according to each example.

In Example 1, the front unit L1 includes, in order from the object side to the image side, negative, positive, negative, and positive lenses G1, G2, G3, and G4. The rear unit L2 includes, in order from the object side to the image side, positive, positive, negative, positive, positive, and negative lenses G5, G6, G7, G8, G9, and G10. The lenses G1, G2, G3 are aspheric lenses Lasph that satisfy inequalities (1) and (2). The lenses G5, G6, and G7 correspond to the lenses GP1, GP2, and GN1, respectively. The lens G4 disposed closest to the image plane in the front unit L1 is a meniscus lens having a concave lens surface on the image side and positive refractive power.

In Example 2, the front unit L1 includes, in order from the object side to the image side, negative, positive, negative, and positive lenses G1, G2, G3, and G4. The rear unit L2 includes, in order from the object side to the image side, positive, positive, negative, negative, positive, positive, and negative lenses G5, G6, G7, G8, G9, G10, and G11. The lenses G1, G2, and G3 are aspheric lenses Lasph that satisfy inequalities (1) and (2). The lenses G5, G6, and G7 correspond to lenses GP1, GP2, and GN1, respectively. The lens G4 disposed closest to the image plane in the front unit L1 is a meniscus lens having a concave lens surface on the image side and positive refractive power.

In Example 3, the front unit L1 includes, in order from the object side to the image side, positive, negative, and positive lenses G1, G2, and G3. The rear unit L2 includes, in order from the object side to the image side, positive, positive, negative, positive, positive, and negative lenses G4, G5, G6, G7, G8, and G9. The lenses G1 and G2 are aspheric lenses Lasph that satisfy inequalities (1) and (2). The lenses G4, G5 and G6 correspond to the lenses GP1, GP2 and GN1, respectively. The lens G3 disposed closest to the image plane in the front unit L1 is a meniscus lens having a concave lens surface on the image side and positive refractive power.

In Example 4, the front unit L1 includes, in order from the object side to the image side, positive, negative, and positive lenses G1, G2, and G3. The rear unit L2 includes, in order from the object side to the image side, positive, positive, negative, negative, positive, positive, and negative lenses G4, G5, G6, G7, G8, G9, and G10. The lenses G1 and G2 are aspheric lenses Lasph that satisfy inequalities (1) and (2). The lenses G4, G5, and G6 correspond to the lenses GP1, GP2 and GN1, respectively. The lens G3 disposed closest to the image plane in the front unit L1 is a meniscus lens having a concave lens surface on the image side and positive refractive power.

In Example 5, the front unit L1 includes, in order from the object side to the image side, positive, negative, and positive lenses G1, G2, and G3. In Example 5, the rear unit L2 includes, in order from the object side to the image side, positive, positive, negative, positive, and negative lenses G4, G5, G6, G7, and G8. The lenses G1 and G2 are aspheric lenses Lasph that satisfy inequalities (1) and (2). The lenses G4, G5, and G6 correspond to lenses GP1, GP2 and GN1, respectively. The lens G3 disposed closest to the image plane in the front unit L1 is a meniscus lens having a concave lens surface on the image side and positive refractive power.

Each focal length fixed lens in the optical system L0 according to each example has aspheric surfaces on both sides. Thereby, aberrations, such as spherical aberration and curvature of field, can be satisfactorily corrected in a case where the size of the optical system L0 is reduced.

In the optical system L0 according to each example, image stabilization can be performed by moving at least part of the optical system L0 in a direction having a component of the direction orthogonal to the optical axis.

In the optical system L0 according to each example, each focal length fixed lens is made of a plastic resin. Thereby, the weight of the optical system L0 can be reduced. Using a plastic resin can use a mold to mold an aspheric shape with a large sagittal amount, and can reduce mass production costs.

Part of the focal length fixed lenses in the optical system L0 may be made of a plastic resin, and other lenses may be made of glass. Combining a lens made of a plastic resin and a lens made of glass can perform excellent aberration correction while optical performance is restrained from changing as the temperature changes.

A description will now be given of numerical examples 1 to 5 corresponding to Examples 1 to 5.

In surface data in each numerical example, r represents a radius of curvature of each optical surface, and d (mm) represents an on-axis distance (distance on the optical axis) between an m-th surface and an (m+1)-th surface, where m is a surface number counted from the light incident side. nd represents a refractive index for the d-line of each optical member, and vd represents an Abbe number of the optical member. The Abbe number vd of a certain material is expressed as follows:

$$vd=(Nd-1)/(NF-NC)$$

where Nd, NF, and NC are refractive indexes based on the d-line (587.6 nm), the F-line (486.1 nm), and the C-line (656.3 nm) in the Fraunhofer line, respectively.

In each numerical example, values of d, focal length (mm), F-number, and half angle of view (degrees) are set in a case where the optical system according to each example is in an in-focus state on an infinite object. "Back focus" is a distance on the optical axis from the final lens surface (lens surface closest to the image plane) to the paraxial image plane expressed in air conversion length. The "overall lens length" is a length obtained by adding the back focus to the distance on the optical axis from the frontmost lens surface (lens surface closest to the object) of the optical system to the final lens surface (not including the optical block FL).

In a case where an optical surface is aspheric, an asterisk * is attached to the right side of the surface number. The aspherical shape is expressed as follows:

$$X = (h^2/R)/[1 + \{1 - (1+K)(h/R)^2\}^{1/2}] + A4 \times h^4 + A6 \times h^6 + A8 \times h^8 + A10 \times h^{10} + A12 \times h^{12} + A14 \times h^{14}$$

where X is a displacement amount from the surface vertex in the optical axis direction, h is a height from the optical axis in the direction orthogonal to the optical axis, R is a paraxial radius of curvature, K is a conical constant, A4, A6, A8, A10, A12, and A14 are aspheric coefficients of respective orders. "e±XX" in each aspheric coefficient means "$\times 10^{\pm XX}$."

Numerical Example 1

UNIT: mm

SURFACE DATA

| Surface No | r | d | nd | vd | Effective Diameter |
|---|---|---|---|---|---|
| 1* | −22.125 | 0.70 | 1.53160 | 55.8 | 11.861 |
| 2* | 5.128 | 0.32 | | | |
| 3* | 12.764 | 0.70 | 1.54390 | 56.0 | 8.205 |
| 4* | −4.734 | 0.10 | | | |
| 5* | −5.911 | 0.65 | 1.53160 | 55.8 | 6.047 |
| 6* | 7.792 | 0.35 | | | |
| 7* | 2.360 | 0.58 | 1.56650 | 37.6 | |
| 8* | 2.941 | 0.82 | | | |
| 9 (Aperture Stop) | ∞ | 0.10 | | | |
| 10* | 7.161 | 1.54 | 1.53160 | 55.8 | |
| 11* | −5.463 | 0.10 | | | |
| 12* | −11.330 | 0.86 | 1.53160 | 55.8 | |
| 13* | −4.610 | 0.40 | | | |
| 14* | −6.245 | 0.50 | 1.67070 | 19.3 | |
| 15* | 29.323 | 0.10 | | | |
| 16* | 3.655 | 0.57 | 1.53160 | 55.8 | |
| 17* | 4.495 | 0.36 | | | |
| 18* | 26.087 | 0.96 | 1.54390 | 56.0 | |
| 19* | −3.236 | 0.18 | | | |
| 20* | 4.492 | 1.10 | 1.54390 | 56.0 | |
| 21* | 1.814 | 0.95 | | | |
| 22 | ∞ | 0.40 | 1.51633 | 64.1 | |
| 23 | ∞ | 1.20 | | | |
| Image Plane | ∞ | | | | |

ASPHERIC DATA 1 st Surface

K = 0.00000e+00 A4 = 2.99135e−03 A6 = −6.93887e−05
A8 = 9.13138e−07
2nd Surface

K = 0.00000e+00 A4 = −8.77996e−03 A6 = 6.27145e−04
A8 = −1.52662e−05
3rd Surface K = 0.00000e+00 A4 = −2.45476e−03 A6 = 2.22198e−04
A8 = 5.85462e−06
4th Surface K = 0.00000e+00 A4 = 3.37608e−02 A6 = −3.16699e−03
A8 = 1.69125e−04
5th Surface K = 0.00000e+00 A4 = 4.49950e−02 A6 = −4.30270e−03
A8 = 2.43106e−04

-continued

UNIT: mm

6th Surface

K = 0.00000e+00 A4 = 3.03151e−02 A6 = −5.38604e−03
A8 = 3.73982e−04
7th Surface

K = 0.00000e+00 A4 = 1.35692e−02 A6 = −4.41424e−03
A8 = −4.49320e−04
8th Surface K = 0.00000e+00 A4 = 2.56634e−02 A6 = 2.11518e−04
A8 = 9.86200e−04
10th Surface K = 0.00000e+00 A4 = 2.06859e−03 A6 = −1.26513e−03
A8 = 5.93600e−04 A10 = −3.52338e−04
11th Surface K = 0.00000e+00 A4 = −3.03816e−02 A6 = 6.08756e−03
A8 = −9.82828e−04 A10 = −8.11642e−05
12th Surface K = 0.00000e+00 A4 = −2.89588e−02 A6 = 7.31629e−03
A8 = −1.34644e−03
13th Surface K = 0.00000e+00 A4 = −1.88989e−02 A6 = −1.49083e−03
14th Surface K = 0.00000e+00 A4 = −1.63470e−02 A6 = −3.11975e−03
A8 = −2.10845e−04
15th Surface K = 0.00000e+00 A4 = −2.09487e−02 A6 = 1.95270e−03
A8 = −6.28343e−05
16th Surface K = −8.43775e−01 A4 = −2.63920e−02 A6 = 2.11482e−03
A8 = −9.25981e−05
17th Surface K = 0.00000e+00 A4 = −1.61263e−02 A6 = 3.03954e−04
A8 = 4.14156e−06
18th Surface K = 0.00000e+00 A4 = 1.21079e−02 A6 = −1.60253e−03
A8 = 3.93041e−05
19th Surface K = −8.83519e+00 A4 = 2.72445e−02 A6 = −3.23002e−03
A8 = 1.55692e−04 A10 = −3.09648e−06
20th Surface K = −7.86236e−01 A4 = −1.41220e−02 A6 = 3.18583e−04
A8 = 2.44586e−05 A10 = −1.68288e−06 A12 = 2.86359e−08
21st Surface K = −4.97962e+00 A4 = −7.36543e−03 A6 = 4.88684e−04
A8 = −2.53870e−05 A10 = 7.06657e−07 A12 = −7.80606e−09

| | |
|---|---|
| Focal Length | 5.00 |
| FNo | 2.88 |
| Half Angle of View (degrees) | 57.64 |
| Image Height | 7.89 |
| Overall Lens Length | 13.41 |
| BF | 2.41 |

Lens Unit Data

| Lens Unit | Starting Surface | Ending Surface | Focal Length |
|---|---|---|---|
| 1 | 1 | 8 | −14.97 |
| 2 | 10 | 21 | 4.41 |

-continued

UNIT: mm

Fixed Focal Length Lens

| Lens | Starting Surface | Focal Length |
|---|---|---|
| 1 | 1 | −7.76 |
| 2 | 3 | 6.44 |
| 3 | 5 | −6.22 |
| 4 | 7 | 15.46 |
| 5 | 10 | 6.09 |
| 6 | 12 | 14.00 |
| 7 | 14 | −7.63 |
| 8 | 16 | 29.78 |
| 9 | 18 | 5.35 |
| 10 | 20 | −6.54 |

Numerical Example 2

UNIT: mm

SURFACE DATA

| Surface No | r | d | nd | vd | Effective Diameter |
|---|---|---|---|---|---|
| 1* | −18.980 | 0.70 | 1.53160 | 55.8 | 10.926 |
| 2* | 4.714 | 0.32 | | | |
| 3* | 9.259 | 0.65 | 1.54390 | 56.0 | 7.729 |
| 4* | −4.647 | 0.10 | | | |
| 5* | −6.445 | 0.50 | 1.53160 | 55.8 | 5.513 |
| 6* | 4.931 | 0.21 | | | |
| 7* | 2.505 | 0.62 | 1.56650 | 37.6 | |
| 8* | 3.876 | 0.90 | | | |
| 9 (Aperture Stop) | ∞ | 0.10 | | | |
| 10* | 8.558 | 1.44 | 1.54390 | 56.0 | |
| 11* | −5.626 | 0.23 | | | |
| 12* | −42.361 | 0.98 | 1.54390 | 56.0 | |
| 13* | −7.559 | 0.10 | | | |
| 14* | −11.352 | 0.50 | 1.67070 | 19.3 | |
| 15* | 12.336 | 0.10 | | | |
| 16* | 5.869 | 0.50 | 1.53160 | 55.8 | |
| 17* | 5.276 | 0.15 | | | |
| 18* | 3.415 | 0.57 | 1.53160 | 55.8 | |
| 19* | 4.968 | 0.17 | | | |
| 20* | 34.621 | 0.90 | 1.54390 | 56.0 | |
| 21* | −4.219 | 0.18 | | | |
| 22* | 3.390 | 1.10 | 1.54390 | 56.0 | |
| 23* | 1.819 | 0.93 | | | |
| 24 | ∞ | 0.40 | 1.51633 | 64.1 | |
| 25 | ∞ | 1.20 | | | |
| Image Plane | ∞ | | | | |

ASPHERIC DATA

1st Surface

K = 0.00000e+00 A4 = 4.62731e−03 A6 = −1.28726e−04
A8 = 1.94960e−06
2nd Surface

K = 0.00000e+00 A4 = −1.07841e−02 A6 = 9.15769e−04
A8 = −2.70904e−05
3rd Surface K = 0.00000e+00 A4 = −6.64511e−03 A6 = 7.52653e−04
A8 = −8.51525e−06
4th Surface K = 0.00000e+00 A4 = 4.23322e−02 A6 = −4.84016e−03
A8 = 3.30114e−04

-continued

UNIT: mm

5th Surface

K = 0.00000e+00 A4 = 5.74568e−02 A6 = −7.25452e−03
A8 = 5.35696e−04
6th Surface

K = 0.00000e+00 A4 = 4.24526e−02 A6 = −9.05290e−03
A8 = 6.98450e−04
7th Surface

K = 0.00000e+00 A4 = 1.95337e−02 A6 = −7.42865e−03
A8 = 1.10045e−04
8th Surface

K = 0.00000e+00 A4 = 1.93211e−02 A6 = −7.82859e−04
A8 = 7.52613e−04
10th Surface K = 0.00000e+00 A4 = −4.13430e−04 A6 = −1.31981e−03
A8 = 2.06755e−04 A10 = −1.42675e−04
11th Surface K = 0.00000e+00 A4 = −2.19332e−02 A6 = 1.84375e−03
A8 = −3.64935e−04 A10 = −6.37679e−05
12th Surface K = 0.00000e+00 A4 = −1.89940e−02 A6 = 2.49235e−03
A8 = −5.53277e−04
13th Surface K = 0.00000e+00 A4 = −2.52550e−02 A6 = −4.15106e−04
14th Surface K = 0.00000e+00 A4 = −2.11389e−02 A6 = −3.34177e−04
A8 = −2.92054e−06
15th Surface K = 0.00000e+00 A4 = −2.0223le−02 A6 = 2.18790e−03
A8 = −8.47405e−05
16th Surface K = 0.00000e+00 A4 = −2.91925e−02 A6 = 2.61526e−03
A8 = −8.99961e−05
17th Surface K = 0.00000e+00 A4 = −3.49911e−02 A6 = 3.41013e−03
A8 = −1.13986e−04
18th Surface K = −1.04019e+00 A4 = −2.22989e−02 A6 = 5.53885e−04
A8 = 9.32163e−06
19th Surface K = 0.00000e+00 A4 = −8.38140e−03 A6 = −6.44152e−04
A8 = 3.74131e−05
20th Surface K = 0.00000e+00 A4 = 1.41519e−02 A6 = −1.82335e−03
A8 = 5.01392e−05
21st Surface K = −6.89916e+00 A4 = 2.84885e−02 A6 = −3.30794e−03
A8 = 1.63369e−04 A10 = −3.34108e−06
22nd Surface K = −2.65752e+00 A4 = −2.00900e−02 A6 = 1.17525e−03
A8 = 2.93659e−06 A10 = −2.48467e−06 A12 = 5.76375e−08
23rd Surface K = −3.94495e+00 A4 = −1.10700e−02 A6 = 8.15668e−04
A8 = −3.97567e−05 A10 = 1.02699e−06 A12 = −1.06696e−08

VARIOUS DATA

| | |
|---|---|
| ZOOMING RATIO | 1.00 |
| Focal Length | 5.00 |
| FNo | 2.88 |

-continued

| UNIT: mm | |
| --- | --- |
| Half Angle of View (degrees) | 57.64 |
| Image Height | 7.89 |
| Overall Lens Length | 13.41 |
| BF | 2.39 |

Lens Unit Data

| Lens Unit | Starting Surface | Ending Surface | Focal Length |
| --- | --- | --- | --- |
| 1 | 1 | 8 | −15.56 |
| 2 | 10 | 23 | 4.46 |

Fixed Focal Length Lens

| Lens | Starting Surface | Focal Length |
| --- | --- | --- |
| 1 | 1 | −7.03 |
| 2 | 3 | 5.78 |
| 3 | 5 | −5.18 |
| 4 | 7 | 10.75 |
| 5 | 10 | 6.47 |
| 6 | 12 | 16.75 |
| 7 | 14 | −8.74 |
| 8 | 16 | −138.78 |
| 9 | 18 | 18.23 |
| 10 | 20 | 6.97 |
| 11 | 22 | −9.58 |

Numerical Example 3

| UNIT: mm | | | | | |
| --- | --- | --- | --- | --- | --- |
| SURFACE DATA | | | | | |
| Surface No | r | d | nd | vd | Effective Diameter |
| 1* | −7.939 | 0.60 | 1.53160 | 55.8 | 8.382 |
| 2* | −6.424 | 0.10 | | | |
| 3* | −25.125 | 0.50 | 1.53160 | 55.8 | 5.113 |
| 4* | 5.290 | 0.43 | | | |
| 5* | 2.267 | 0.51 | 1.56650 | 37.6 | |
| 6* | 2.818 | 0.78 | | | |
| 7 (Aperture Stop) | ∞ | 0.10 | | | |
| 8* | 9.497 | 1.04 | 1.53160 | 55.8 | |
| 9* | −8.508 | 0.10 | | | |
| 10* | −21.080 | 1.13 | 1.53160 | 55.8 | |
| 11* | −3.786 | 0.56 | | | |
| 12* | −2.377 | 0.50 | 1.67070 | 19.3 | |
| 13* | −4.105 | 0.23 | | | |
| 14* | 4.056 | 0.73 | 1.53160 | 55.8 | |
| 15* | 4.370 | 0.61 | | | |
| 16* | −40.440 | 0.99 | 1.53160 | 55.8 | |
| 17* | −2.574 | 0.18 | | | |
| 18* | 6.294 | 1.10 | 1.54390 | 56.0 | |
| 19* | 1.794 | 0.93 | | | |
| 20 | ∞ | 0.40 | 1.51633 | 64.1 | |
| 21 | ∞ | 1.20 | | | |
| Image Plane | ∞ | | | | |

ASPHERIC DATA

1st Surface

K = 0.00000e+00 A4 = 9.30990e−03 A6 = −3.58240e−04
A8 = 9.54582e−06
2nd Surface

K = 0.00000e+00 A4 = 2.66359e−02 A6 = −1.99812e−03
A8 = 8.41741e−05

-continued

UNIT: mm

3rd Surface

K = 0.00000e+00 A4 = 3.79372e−02 A6 = −1.39100e−03
A8 = 7.73195e−05
4th Surface

K = 0.00000e+00 A4 = 8.30544e−03 A6 = 7.72943e−03
A8 = −1.08878e−03
5th Surface

K = 0.00000e+00 A4 = −2.54322e−02 A6 = 8.65790e−03
A8 = −2.23637e−03
6th Surface K = 0.00000e+00 A4 = −8.83911e−04 A6 = 6.29663e−03
A8 = −5.82958e−04
8th Surface K = 0.00000e+00 A4 = −4.91809e−04 A6 = −1.28244e−03
A8 = 7.44474e−04 A10 = −3.78859e−04
9th Surface K = 0.00000e+00 A4 = −2.14540e−02 A6 = 5.52579e−04
A8 = 6.02977e−04 A10 = −2.37941e−04
10th Surface K = 0.00000e+00 A4 = −2.05109e−02 A6 = 1.13226e−03
11th Surface K = 0.00000e+00 A4 = −1.67901e−02 A6 = −1.60115e−05
12th Surface K = 0.00000e+00 A4 = 6.79112e−03 A6 = 3.43251e−03
A8 = −1.30171e−04
13th Surface K = 0.00000e+00 A4 = 6.45622e−04 A6 = 2.61491e−03
A8 = −1.91434e−04
14th Surface K = −1.00267e+00 A4 = −1.59819e−02 A6 = 6.18220e−04
A8 = −3.03179e−05
15th Surface K = 0.00000e+00 A4 = −1.07829e−02 A6 = −6.02261e−04
A8 = 3.40396e−05
16th Surface K = 0.00000e+00 A4 = 1.73588e−02 A6 = −2.24424e−03
A8 = 5.78829e−05
17th Surface K = −6.98573e+00 A4 = 2.38584e−02 A6 = −2.67059e−03
A8 = 1.18642e−04 A10 = −2.10872e−06
18th Surface K = −1.00000e+01 A4 = −3.85591e−03 A6 = −9.68384e−04
A8 = 1.09785e−04 A10 = −4.38561e−06 A12 = 6.22138e−08
19th Surface K = −5.64269e+00 A4 = −5.83331e−03 A6 = 3.04762e−04
A8 = −1.56297e−05 A10 = 4.14627e−07 A12 = −4.26432e−09

VARIOUS DATA

| ZOOMING RATIO | 1.00 |
| --- | --- |
| Focal Length | 5.95 |
| FNo | 2.40 |
| Half Angle of View (degrees) | 52.98 |
| Image Height | 7.89 |
| Overall Lens Length | 12.60 |
| BF | 2.39 |

-continued

| UNIT: mm | | | |
| --- | --- | --- | --- |

Lens Unit Data

| Lens Unit | Starting Surface | Ending Surface | Focal Length |
| --- | --- | --- | --- |
| 1 | 1 | 6 | −22.75 |
| 2 | 8 | 19 | 5.00 |

Fixed Focal Length Lens

| Lens | Starting Surface | Focal Length |
| --- | --- | --- |
| 1 | 1 | 55.66 |
| 2 | 3 | −8.17 |
| 3 | 5 | 15.36 |
| 4 | 8 | 8.62 |
| 5 | 10 | 8.49 |
| 6 | 12 | −9.52 |
| 7 | 14 | 58.78 |
| 8 | 16 | 5.12 |
| 9 | 18 | −5.05 |

Numerical Example 4

| UNIT: mm | | | | | |
| --- | --- | --- | --- | --- | --- |

SURFACE DATA

| Surface No | r | d | nd | vd | Effective Diameter |
| --- | --- | --- | --- | --- | --- |
| 1* | −9.227 | 0.60 | 1.53160 | 55.8 | 8.306 |
| 2* | −6.975 | 0.10 | | | |
| 3* | −22.949 | 0.50 | 1.53160 | 55.8 | 5.040 |
| 4* | 4.381 | 0.39 | | | |
| 5* | 2.313 | 0.53 | 1.56650 | 37.6 | |
| 6* | 3.157 | 0.81 | | | |
| 7 (Aperture Stop) | ∞ | 0.10 | | | |
| 8* | 8.945 | 0.96 | 1.53160 | 55.8 | |
| 9* | −9.244 | 0.10 | | | |
| 10* | −39.784 | 1.24 | 1.54390 | 56.0 | |
| 11* | −4.112 | 0.51 | | | |
| 12* | −2.339 | 0.50 | 1.67070 | 19.3 | |
| 13* | −3.900 | 0.10 | | | |
| 14* | 6.256 | 0.72 | 1.53160 | 55.8 | |
| 15* | 5.108 | 0.15 | | | |
| 16* | 3.494 | 0.61 | 1.53160 | 55.8 | |
| 17* | 4.553 | 0.36 | | | |
| 18* | −14.956 | 0.89 | 1.53160 | 55.8 | |
| 19* | −2.546 | 0.18 | | | |
| 20* | 6.697 | 1.10 | 1.54390 | 56.0 | |
| 21* | 1.924 | 0.90 | | | |
| 22 | ∞ | 0.40 | 1.51633 | 64.1 | |
| 23 | ∞ | 1.20 | | | |
| Image Plane | ∞ | | | | |

ASPHERIC DATA

1st Surface

K = 0.00000e+00 A4 = 9.06651e−03 A6 = −3.40350e−04
A8 = 8.13190e−06
2nd Surface

K = 0.00000e+00 A4 = 2.75775e−02 A6 = −1.79887e−03
A8 = 5.61471e−05
3rd Surface

K = 0.00000e+00 A4 = 4.01333e−02 A6 = −1.71340e−03
A8 = 1.47724e−04

-continued

| UNIT: mm | |
| --- | --- |

4th Surface

K = 0.00000e+00 A4 = 6.53886e−03 A6 = 7.91981e−03
A8 = −9.85749e−04
5th Surface

K = 0.00000e+00 A4 = −2.61273e−02 A6 = 9.03281e−03
A8 = −1.97567e−03
6th Surface K = 0.00000e+00 A4 = 2.93659e−03 A6 = 5.54727e−03
8th Surface K = 0.00000e+00 A4 = −7.05912e−04 A6 = −1.93535e−03
A8 = 8.78449e−04 A10 = −4.76791e−04
9th Surface K = 0.00000e+00 A4 = −2.30611e−02 A6 = 1.22514e−03
A8 = 4.18199e−04 A10 = −2.62195e−04
10th Surface K = 0.00000e+00 A4 = −2.01089e−02 A6 = 2.34407e−03
11th Surface K = 0.00000e+00 A4 = −1.83241e−02 A6 = 5.98154e−04
12th Surface K = 0.00000e+00 A4 = 1.98536e−02 A6 = 9.12904e−04
A8 = −2.88114e−05
13th Surface K = 0.00000e+00 A4 = 1.22988e−02 A6 = 6.76600e−04
A8 = −8.62566e−05
14th Surface K = 0.00000e+00 A4 = −1.58318e−02 A6 = 5.65060e−04
A8 = −2.61556e−05
15th Surface K = 0.00000e+00 A4 = −1.60444e−02 A6 = −7.75094e−05
A8 = 2.77918e−05
16th Surface K = −4.32278e+00 A4 = −3.10800e−03 A6 = −1.23027e−03
A8 = 4.08013e−05
17th Surface K = 0.00000e+00 A4 = −7.48985e−03 A6 = −7.41637e−04
A8 = 3.02892e−05
18th Surface K = 0.00000e+00 A4 = 1.65115e−02 A6 = −1.8316le−03
A8 = 4.71444e−05
19th Surface K = −6.25796e+00 A4 = 2.56064e−02 A6 = −2.76340e−03
A8 = 1.22002e−04 A10 = −2.08748e−06
20th Surface K = −3.33188e−01 A4 = −4.61155e−03 A6 = −1.10936e−03
A8 = 1.21382e−04 A10 = −4.51532e−06 A12 = 5.75594e−08
21 st Surface K = −6.13643e+00 A4 = −4.49898e−03 A6 = 1.32358e−04
A8 = −6.79773e−06 A10 = 2.30076e−07 A12 = −2.83102e−09

VARIOUS DATA

| ZOOMING RATIO | 1.00 |
| --- | --- |
| Focal Length | 5.95 |
| FNo | 2.40 |
| Half Angle of View (degrees) | 52.98 |
| Image Height | 7.89 |
| Overall Lens Length | 12.80 |
| BF | 2.36 |

-continued

| UNIT: mm | | | |
|---|---|---|---|
| Lens Unit Data | | | |
| Lens Unit | Starting Surface | Ending Surface | Focal Length |
| 1 | 1 | 6 | −20.42 |
| 2 | 8 | 21 | 4.93 |

| Fixed Focal Length Lens | | |
|---|---|---|
| Lens | Starting Surface | Focal Length |
| 1 | 1 | 49.22 |
| 2 | 3 | −6.88 |
| 3 | 5 | 12.46 |
| 4 | 8 | 8.71 |
| 5 | 10 | 8.33 |
| 6 | 12 | −10.00 |
| 7 | 14 | −66.82 |
| 8 | 16 | 23.56 |
| 9 | 18 | 5.63 |
| 10 | 20 | −5.40 |
| 11 | 22 | 0.00 |

Numerical Example 5

| UNIT: mm | | | | | |
|---|---|---|---|---|---|
| SURFACE DATA | | | | | |
| Surface No | l | d | nd | vd | Effective Diameter |
| 1* | −7.407 | 0.65 | 1.54390 | 56.0 | 8.676 |
| 2* | −5.451 | 0.10 | | | |
| 3* | −10.786 | 0.60 | 1.53160 | 55.8 | 5.668 |
| 4* | 98.794 | 0.33 | | | |
| 5* | 2.485 | 0.50 | 1.53160 | 55.8 | |
| 6* | 2.515 | 0.62 | | | |
| 7 (Aperture Stop) | ∞ | 0.10 | | | |
| 8* | 12.199 | 1.29 | 1.53160 | 55.8 | |
| 9* | −4.975 | 0.26 | | | |
| 10* | −9.899 | 1.05 | 1.54390 | 56.0 | |
| 11* | −5.017 | 0.53 | | | |
| 12* | −2.532 | 0.50 | 1.67070 | 19.3 | |
| 13* | −4.875 | 0.52 | | | |
| 14* | 21.739 | 1.01 | 1.54390 | 56.0 | |
| 15* | −2.631 | 0.18 | | | |
| 16* | 5.114 | 1.10 | 1.54390 | 56.0 | |
| 17* | 1.629 | 1.01 | | | |
| 18 | ∞ | 0.40 | 1.51633 | 64.1 | |
| 19 | ∞ | 1.20 | | | |
| Image Plane | ∞ | | | | |

| ASPHERIC DATA |
|---|

1st Surface

K = 0.00000e+00 A4 = 8.73660e−03 A6 = −3.86975e−04
A8 = 1.04575e−05
2nd Surface

K = 0.00000e+00 A4 = 2.31772e−02 A6 = −1.79562e−03
A8 = 6.76999e−05
3rd Surface

K = 0.00000e+00 A4 = 3.11776e−02 A6 = −1.95264e−03
A8 = 4.93023e−05
4th Surface

K = 0.00000e+00 A4 = 2.14908e−02 A6 = −8.30590e−04
A8 = −7.86853e−05

-continued

| UNIT: mm |
|---|

5th Surface

K = 0.00000e+00 A4 = −4.45087e−03 A6 = 7.94719e−04
A8 = −1.36434e−03
6th Surface K = 0.00000e+00 A4 = −1.28146e−03 A6 = 3.52976e−03
A8 = −1.40989e−03
8th Surface K = 0.00000e+00 A4 = −1.54143e−03 A6 = −4.85062e−04
A8 = −2.88392e−04 A10 = −1.06599e−05
9th Surface K = 0.00000e+00 A4 = −2.69867e−02 A6 = 2.26400e−03
A8 = 1.17410e−04 A10 = −1.25200e−04
10th Surface K = 0.00000e+00 A4 = −3.49850e−02 A6 = 2.55543e−03
11th Surface K = 0.00000e+00 A4 = −2.44834e−02 A6 = −5.41931e−04
12th Surface K = 0.00000e+00 A4 = −1.40846e−02 A6 = 5.39612e−03
A8 = −1.65705e−04
13th Surface K = 0.00000e+00 A4 = −2.15427e−02 A6 = 5.03438e−03
A8 = −2.49745e−04
14th Surface K = 0.00000e+00 A4 = 1.07811e−02 A6 = −1.34715e−03
A8 = 1.54898e−05
15th Surface K = −5.62876e+00 A4 = 3.33588e−02 A6 = −4.02479e−03
A8 = 1.98832e−04 A10 = −3.92120e−06
16th Surface K = −2.81550e+00 A4 = −1.21176e−02 A6 = −1.84103e−04
A8 = 9.57561e−05 A10 = −5.21006e−06 A12 = 8.61690e−08
17th Surface K = −4.50949e+00 A4 = −7.94993e−03 A6 = 5.20856e−04
A8 = −2.59464e−05 A10 = 6.93402e−07 A12 = −7.59255e−09

| Focal Length | 5.95 |
|---|---|
| FNo | 2.80 |
| Half Angle of View (degrees) | 52.98 |
| Image Height | 7.89 |
| Overall Lens Length | 11.80 |
| BF | 2.47 |

| Lens Unit Data | | | |
|---|---|---|---|
| Lens Unit | Starting Surface | Ending Surface | Focal Length |
| 1 | 1 | 6 | −93.92 |
| 2 | 8 | 19 | 5.55 |

| Fixed Focal Length Lens | | |
|---|---|---|
| Lens | Starting Surface | Focal Length |
| 1 | 1 | 33.98 |
| 2 | 3 | −18.26 |
| 3 | 5 | 58.02 |
| 4 | 8 | 6.83 |
| 5 | 10 | 17.39 |
| 6 | 12 | −8.59 |
| 7 | 14 | 4.38 |
| 8 | 16 | −4.94 |

Tables 1 and 2 below summarize various values in each example:

TABLE 1

|  |  | EX. 1 | EX. 2 | EX. 3 | EX. 4 | EX. 5 |
|---|---|---|---|---|---|---|
| ASPHERIC LENS |  | G1 G2 G3 | G1 G2 G3 | G1 G2 | G1 G2 | G1 G2 |
| ASPHERIC SURFACES |  | G1 OBJECT SIDE SURFACE G2 OBJECT SIDE SURFACE G3 OBJECT SIDE SURFACE | G1 OBJECT SIDE SURFACE G2 OBJECT SIDE SURFACE G3 OBJECT SIDE SURFACE | G1 OBJECT SIDE SURFACE G2 OBJECT SIDE SURFACE | G1 OBJECT SIDE SURFACE G2 OBJECT SIDE SURFACE | G1 OBJECT SIDE SURFACE G2 OBJECT SIDE SURFACE |
| f |  | 5.000 | 5.000 | 5.950 | 5.950 | 5.950 |
| T | G1 OBJECT SIDE SURFACE | 4.232 | 3.996 | 3.018 | 3.026 | 2.900 |
|  | G2 OBJECT SIDE SURFACE | 3.209 | 2.973 | 2.319 | 2.326 | 2.150 |
|  | G3 OBJECT SIDE SURFACE | 2.410 | 2.223 |  |  |  |
| EA | G1 OBJECT SIDE SURFACE | 11.861 | 10.926 | 8.382 | 8.306 | 8.676 |
|  | G2 OBJECT SIDE SURFACE | 8.205 | 7.729 | 5.113 | 5.04 | 5.688 |
|  | G3 OBJECT SIDE SURFACE | 6.047 | 5.513 |  |  |  |
| x1 | G1 OBJECT SIDE SURFACE | 1.642 | 1.738 | 1.442 | 1.307 | 1.438 |
|  | G2 OBJECT SIDE SURFACE | 0.919 | 0.784 | 1.054 | 1.092 | 0.941 |
|  | G3 OBJECT SIDE SURFACE | 1.601 | 1.432 |  |  |  |
| x2 | G1 OBJECT SIDE SURFACE | 1.037 | 1.215 | 0.935 | 0.905 | 0.691 |
|  | G2 OBJECT SIDE SURFACE | 0.764 | 0.573 | 1.827 | 2.151 | 0.778 |
|  | G3 OBJECT SIDE SURFACE | 1.572 | 1.494 |  |  |  |
| Rref | G1 OBJECT SIDE SURFACE | −47.350 | −50.678 | −11.387 | −14.129 | −9.781 |
|  | G2 OBJECT SIDE SURFACE | 14.503 | 11.608 | 17.409 | 16.842 | −38.545 |
|  | G3 OBJECT SIDE SURFACE | −17.569 | −29.005 |  |  |  |
| D1 |  | 4.232 | 3.996 | 2.918 | 3.926 | 2.800 |
| D2 |  | 6.767 | 7.021 | 7.287 | 7.506 | 6.525 |
| Dsum |  | 8.164 | 8.457 | 7.104 | 7.632 | 6.696 |
| D0 |  | 11.000 | 11.018 | 10.205 | 10.432 | 9.325 |
| fGP1 |  | 6.087 | 6.473 | 8.615 | 8.711 | 6.825 |
| fLF |  | −14.970 | −15.559 | −22.750 | −20.421 | −93.923 |
| fLR |  | 4.410 | 4.459 | 5.002 | 4.926 | 5.548 |
| fGN1 |  | −7.633 | −8.740 | −9.521 | −9.997 | −8.591 |
| fGN2 |  | −6.541 | −9.575 | −5.049 | −5.403 | −4.943 |
| h |  | 2.103 | 1.811 | 2.118 | 1.938 | 2.434 |
| hGN2 |  | 3.258 | 3.091 | 3.188 | 3.157 | 3.262 |
| n |  | 1.671 | 1.671 | 1.671 | 1.671 | 1.671 |
| vd |  | 19.300 | 19.300 | 19.300 | 19.300 | 19.300 |

TABLE 2

| INEQUALITY |  |  | EX. 1 | EX. 2 | EX. 3 | EX. 4 | EX. 5 |
|---|---|---|---|---|---|---|---|
| −1 | x1/f | G1 OBJECT SIDE SURFACE | 0.328 | 0.348 | 0.242 | 0.220 | 0.242 |
|  |  | G2 OBJECT SIDE SURFACE | 0.184 | 0.157 | 0.177 | 0.183 | 0.158 |
|  |  | G3 OBJECT SIDE SURFACE | 0.320 | 0.286 |  |  |  |
| −2 | x2/f | G1 OBJECT SIDE SURFACE | 0.207 | 0.243 | 0.157 | 0.152 | 0.116 |
|  |  | G2 OBJECT SIDE SURFACE | 0.153 | 0.115 | 0.307 | 0.361 | 0.131 |
|  |  | G3 OBJECT SIDE SURFACE | 0.314 | 0.299 |  |  |  |

TABLE 2-continued

| INEQUALITY | | | EX. 1 | EX. 2 | EX. 3 | EX. 4 | EX. 5 |
|---|---|---|---|---|---|---|---|
| −3 | \|Rref\|/f | G1 OBJECT SIDE SURFACE | 9.470 | 10.136 | 1.914 | 2.375 | 1.644 |
| | | G2 OBJECT SIDE SURFACE | 2.901 | 2.322 | 2.926 | 2.830 | 6.478 |
| | | G3 OBJECT SIDE SURFACE | 3.514 | 5.801 | | | |
| −4 | D1/D2 | | 0.625 | 0.569 | 0.401 | 0.390 | 0.429 |
| −5 | fGP1/f | | 1.217 | 1.295 | 1.448 | 1.464 | 1.147 |
| −6 | f/fLF | | −0.334 | −0.321 | −0.262 | −0.291 | −0.063 |
| −7 | fLR/f | | 0.882 | 0.892 | 0.841 | 0.828 | 0.932 |
| −8 | fGN2/f | | −1.308 | −1.915 | −0.849 | −0.908 | −0.831 |
| −9 | fGN1/f | | −1.527 | −1.748 | −1.600 | −1.680 | −1.444 |
| −10 | Dsum/D0 | | 0.742 | 0.768 | 0.696 | 0.732 | 0.718 |
| −11 | bGN2/D2 | | 0.481 | 0.440 | 0.438 | 0.421 | 0.500 |
| −12 | h/D1 | | 0.497 | 0.453 | 0.726 | 0.662 | 0.869 |
| −13 | n | | 1.671 | 1.671 | 1.671 | 1.671 | 1.671 |
| −14 | vd | | 19.300 | 19.300 | 19.300 | 19.300 | 19.300 |

Image Pickup Apparatus

Figure 12:
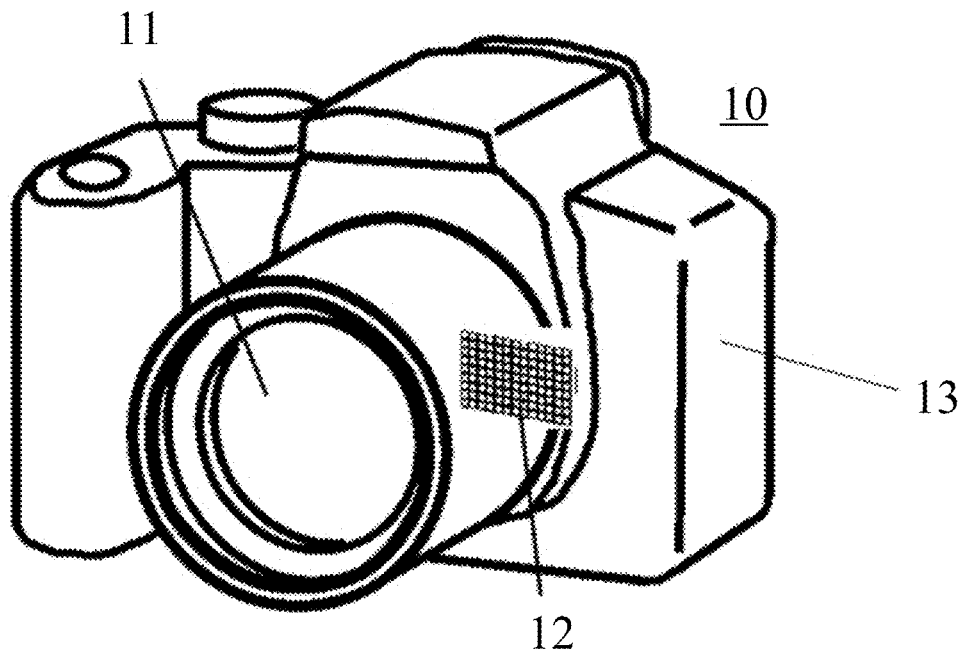
FIG. 12 is a schematic diagram of an image pickup apparatus.

Referring now to FIG. 12, a description will be given of a digital still camera (image pickup apparatus) using the optical system according to each example as an imaging optical system. In FIG. 12, reference numeral 10 denotes a camera body, and reference numeral 11 denotes an imaging optical system including any one of the optical systems according to Examples 1 to 5. Reference numeral 12 denotes a solid-state image sensor (photoelectric conversion element) such as a CCD sensor or a CMOS sensor built in the camera body 10 and configured to receive and photoelectrically convert an optical image formed by the imaging optical system 11. The camera body 10 may be a so-called single-lens reflex camera having a quick turn mirror, or a so-called mirrorless camera without a quick turn mirror.

Applying the optical system according to each example to an image pickup apparatus such as a digital still camera can provide an image pickup apparatus having a small lens.

Lens Apparatus

Figure 13:
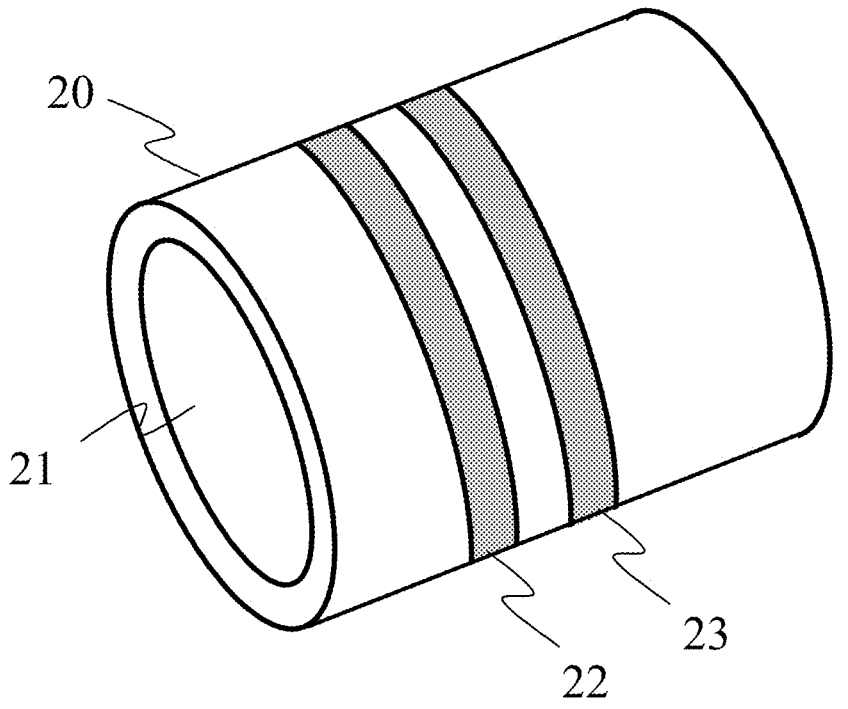
FIG. 13 is a schematic diagram of a lens apparatus.

FIG. 13 is a schematic external view of a lens apparatus 20 having the optical system according to each example as an imaging optical system. The lens apparatus 20 is a so-called interchangeable lens attachable to and detachable from a camera body (not illustrated). The lens apparatus 20 includes an imaging optical system 21 using any one of the optical systems according to Examples 1 to 5. The lens apparatus 20 has a focus operation unit 22 and an operation unit 23 that changes an imaging mode.

In a case where the user operates the focus operation unit 22, the arrangement of the imaging optical system 21 can be mechanically or electrically changed, and a focus position can be changed.

The user may operate the operation unit 23 to change the arrangement of the lens units in the imaging optical system 21 for purposes other than focusing. For example, the aberration of the imaging optical system 21 may be changed by mechanically or electrically changing the arrangement of the lens units in the imaging optical system 21 according to the operation of the operation unit 23. At this time, the focus position may not substantially change.

This example can provide an optical system that can correct distortion and a peripheral light amount.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-097978, filed on Jun. 17, 2022, which is hereby incorporated by reference herein in its entirety.

What is claimed is:

1. An optical system comprising, in order from an object side to an image side, a front unit having negative refractive power, an aperture stop, and a rear unit having positive refractive power, wherein the front unit includes a plurality of aspheric lenses, and wherein the following inequality is satisfied:

$$0.05 < x1/f < 0.50$$

where T is a distance on an optical axis from a surface vertex of an aspheric surface on the object side of each of the plurality of aspheric lenses to the aperture stop, EA is an effective diameter of the aspheric surface, x1 is a distance in an optical axis direction between a position on a reference spherical surface, which is defined as a spherical surface passing a position on the aspheric surface distant from the optical axis by a distance of T/2 in a direction orthogonal to the optical axis and the surface vertex, distant from the optical axis by a distance of EA/2 in the direction orthogonal to the optical axis and a position on the aspheric surface distant from the optical axis by the distance of EA/2 in the direction orthogonal to the optical axis, and f is a focal length of the optical system.

2. The optical system according to claim 1, wherein the following inequality is satisfied:

$$0.05 < x2/f < 0.50$$

where x2 is a distance in the optical axis direction between a position on the reference spherical surface distant from the optical axis by a distance of 5×T/4 in the direction orthogonal to the optical axis and a position on the aspheric surface distant from the optical axis by the distance of 5×T/4 in the direction orthogonal to the optical axis.

3. The optical system according to claim 1, wherein the following inequality is satisfied:

$$1.30 < |Rref|/f$$

where Rref is a radius of curvature of the reference spherical surface.

4. The optical system according to claim 1, wherein the following inequality is satisfied:

$$0.20 < D1/D2 < 0.80$$

where D1 is a distance on the optical axis from a lens surface on the object side of an aspheric lens disposed closest to an object among the plurality of aspheric lenses to the aperture stop, and D2 is a distance on the optical axis from the aperture stop to a lens surface closest to an image plane in the rear unit.

5. The optical system according to claim 1, wherein a first lens disposed closest to an object in the rear unit has positive refractive power.

6. The optical system according to claim 5, wherein the following inequality is satisfied:

$$0.70<fGP1/f<2.00$$

where fGP1 is a focal length of the first lens.

7. The optical system according to claim 1, wherein the front unit includes a lens having negative refractive power and a lens having positive refractive power.

8. The optical system according to claim 1, wherein the following inequality is satisfied:

$$-0.70<f/fLF\leq0.00$$

where fLF is a focal length of the front unit.

9. The optical system according to claim 1, wherein the following inequality is satisfied:

$$0.50<fLR/f<1.30$$

where fLR is a focal length of the rear unit.

10. The optical system according to claim 1, wherein a final lens disposed closest to an image plane in the rear unit has negative refractive power.

11. The optical system according to claim 10, wherein the following inequality is satisfied:

$$-2.50<fGN2/f<-0.50$$

where fGN2 is focal length of the final lens.

12. The optical system according to claim 10, wherein a lens surface on the object side and a lens surface on the image side of the final lens are aspheric.

13. The optical system according to claim 1, wherein the rear unit includes, in order from the object side to the image side, a first lens having positive refractive power, a second lens having positive refractive power, and a third lens having negative refractive power.

14. The optical system according to claim 13, wherein the following inequality is satisfied:

$$-2.50<fGN1/f<-0.80$$

where fGN1 is a focal length of the third lens.

15. The optical system according to claim 13, wherein the following inequality is satisfied:

$$1.620<n<1.750$$

where n is refractive power of the third lens.

16. The optical system according to claim 13, wherein the following inequality is satisfied:

$$12<vd<28$$

where vd is an Abbe number of the third lens.

17. The optical system according to claim 13, wherein a lens surface on the image side of the second lens has a concave shape toward the image side near the optical axis, and a convex shape toward the image side in a peripheral portion, and wherein the following inequality is satisfied:

$$0.25<hGN2/D2<0.70$$

where hGN2 is a distance in the direction orthogonal to the optical axis from the optical axis to a stationary point on a lens surface on the image side of the second lens.

18. The optical system according to claim 13, wherein at least one of a lens surface on the object side and a lens surface on the image side of each of the first lens, the second lens, and the third lens is aspheric.

19. The optical system according to claim 1, wherein the following inequality is satisfied:

$$0.05<Dsum/D0<0.90$$

where Dsum is an overall thickness of lenses included in the optical system, and DO is a distance on the optical axis from a lens surface closest to an object of the optical system to a lens surface closest to an image plane of the optical system.

20. The optical system according to claim 1, wherein the following inequality is satisfied:

$$0.20<h/D1<1.00$$

where h is a distance in the direction orthogonal to the optical axis from the optical axis to a stationary point on a lens surface on the object side of an aspheric lens disposed closest to an object among the plurality of aspheric lenses.

21. The optical system according to claim 1, wherein a lens disposed closest to an image plane in the front unit is a meniscus lens having positive refractive power and a concave lens surface on the image side.

22. An image pickup apparatus comprising:

an optical system; and an image sensor configured to receive an image formed by the optical system, wherein the optical system includes, in order from an object side to an image side, a front unit having negative refractive power, an aperture stop, and a rear unit having positive refractive power, wherein the front unit includes a plurality of aspheric lenses, and wherein the following inequality is satisfied:

$$0.05<x1/f<0.50$$

where T is a distance on an optical axis from a surface vertex of an aspheric surface on the object side of each of the plurality of aspheric lenses to the aperture stop, EA is an effective diameter of the aspheric surface, x1 is a distance in an optical axis direction between a position on a reference spherical surface, which is defined as a spherical surface passing a position on the aspheric surface distant from the optical axis by a distance of T/2 in a direction orthogonal to the optical axis and the surface vertex, distant from the optical axis by a distance of EA/2 in the direction orthogonal to the optical axis and a position on the aspheric surface distant from the optical axis by the distance of EA/2 in the direction orthogonal to the optical axis, and f is a focal length of the optical system.

23. A lens apparatus comprising:

an optical system; and an operation unit operable by a user, wherein the optical system includes, in order from an object side to an image side, a front unit having negative refractive power, an aperture stop, and a rear unit having positive refractive power, wherein the front unit includes a plurality of aspheric lenses, and wherein the following inequality is satisfied:

$$0.05<x1/f<0.50$$

where T is a distance on an optical axis from a surface vertex of an aspheric surface on the object side of each of the plurality of aspheric lenses to the aperture stop, EA is an effective diameter of the aspheric surface, x1 is a distance in an optical axis direction between a position on a reference spherical surface, which is defined as a spherical surface passing a position on the aspheric surface distant from the optical axis by a distance of T/2 in a direction orthogonal to the optical axis and the surface vertex, distant from the optical axis by a distance of EA/2 in the direction orthogonal to the optical axis and a position on the aspheric surface distant from the optical axis by the distance of EA/2 in the direction orthogonal to the optical axis, and f is a focal length of the optical system.

* * * * *